United States Patent
Pham et al.

(10) Patent No.: US 12,314,542 B2
(45) Date of Patent: May 27, 2025

(54) OPTIMIZED ANALYSIS AND ACCESS TO INTERACTIVE CONTENT

(71) Applicant: Truist Bank, Charlotte, NC (US)

(72) Inventors: Phu Pham, Lawrenceville, GA (US); Merle Hidinger, Midlothian, VA (US); Jun Ji, Glen Allen, VA (US)

(73) Assignee: TRUIST BANK, Charlotte, NC (US)

( * ) Notice: Subject to any disclaimer, the term of this patent is extended or adjusted under 35 U.S.C. 154(b) by 229 days.

(21) Appl. No.: 18/057,932

(22) Filed: Nov. 22, 2022

(65) Prior Publication Data

US 2024/0168610 A1    May 23, 2024

(51) Int. Cl.
| | | |
|---|---|---|
| G06F 17/00 | (2019.01) | |
| G06F 3/0484 | (2022.01) | |
| G06F 40/30 | (2020.01) | |
| G06N 3/0442 | (2023.01) | |
| G06N 3/045 | (2023.01) | |

(52) U.S. Cl.
CPC ........... *G06F 3/0484* (2013.01); *G06F 40/30* (2020.01); *G06N 3/0442* (2023.01); *G06N 3/045* (2023.01)

(58) Field of Classification Search
CPC ..... G06F 3/0484; G06F 40/30; G06N 3/0442; G06N 3/045; G06N 3/0455; G06N 5/01; G06N 5/025; G06N 3/0464; G06N 3/047; G06N 3/048; G06N 3/0499; G06N 3/084; G06N 3/09; G06N 3/088; G06N 7/01
See application file for complete search history.

(56) References Cited

U.S. PATENT DOCUMENTS

| | | |
|---|---|---|
| 9,009,093 B1 | 4/2015 | Omoigui |
| 10,395,648 B1 | 8/2019 | Benkreira |
| 11,144,854 B1 | 10/2021 | Mouawad |
| 11,533,242 B1 | 12/2022 | Nesteroff |
| 11,699,113 B1 | 7/2023 | Pearson |
| 2015/0220774 A1 | 8/2015 | Ebersman |
| 2016/0277500 A1 | 9/2016 | Flood |
| 2017/0083825 A1 | 3/2017 | Battersby |
| 2018/0040001 A1 | 2/2018 | Sahin |
| 2020/0050705 A1* | 2/2020 | Fox ................ G06F 40/30 |
| 2020/0097817 A1 | 3/2020 | Harris |
| 2020/0104697 A1 | 4/2020 | Bhatia |

(Continued)

OTHER PUBLICATIONS

Jang, Jungsun, et al. "A novel density-based clustering method using word embedding features for dialogue intention recognition." Cluster Computing 19 (2016): 2315-2326 (Year: 2016).*

(Continued)

*Primary Examiner* — Andrew T McIntosh
(74) *Attorney, Agent, or Firm* — Michael A. Springs, Esq.; Shumaker, Loop & Kendrick, LLP; Patrick B. Horne

(57) ABSTRACT

Disclosed are systems and methods that automate the process of analyzing interactive content data using artificial intelligence and natural language processing technology to generate subject matter identifiers and sentiment identifiers that characterize the interaction represented by the content data. The automated processing classifies, reduces, segments, and filters content data to accurately, automatically, and efficiently characterize the content data. The results of the analysis in turn allow for identification of system and service problems and the implementation of system enhancements.

11 Claims, 11 Drawing Sheets

(56) References Cited

U.S. PATENT DOCUMENTS

| | | |
|---|---|---|
| 2020/0110805 A1 | 4/2020 | Beaver |
| 2020/0184521 A1 | 6/2020 | Jyoti |
| 2020/0412868 A1 | 12/2020 | Jones |
| 2022/0180865 A1* | 6/2022 | Kwatra .................. G10L 15/20 |
| 2022/0343250 A1* | 10/2022 | Tremblay ........... G06Q 10/0633 |
| 2023/0080660 A1* | 3/2023 | Miletic ................. G10L 15/063 |
| | | 382/103 |
| 2023/0161949 A1* | 5/2023 | Yang .................... G06F 16/954 |
| | | 715/255 |
| 2023/0419988 A1* | 12/2023 | Choi ....................... G10L 25/30 |

OTHER PUBLICATIONS

Takayama, Junya, Eriko Nomoto, and Yuki Arase. "Dialogue breakdown detection robust to variations in annotators and dialogue systems." Computer Speech & Language 54 (2019): 31-43 (Year: 2019).*

Zhang, Hanlei, et al. "Discovering new intents with deep aligned clustering." Proceedings of the AAAI Conference on Artificial Intelligence. vol. 35. No. 16. 2021 (Year: 2021).*

\* cited by examiner

OPTIMIZED ANALYSIS AND ACCESS TO INTERACTIVE CONTENT

TECHNICAL FIELD AND BACKGROUND

The present invention relates generally to the field of processing of alphanumeric content data generated during an interaction between a user and a provider to accurately ascertain subjects and sentiment reflected in the content data. More particularly, the invention relates to systems and methods that automatically classify, segment, filter, and display alphanumeric content data generated during a user-provider interaction through the use of artificial intelligence and natural language processing technology.

Conventional techniques for analyzing a user-provider interaction, or "shared experience," include manually selecting from among a discrete set of descriptors intended to characterize the interaction, or alternatively, manually reviewing and summarizing alphanumeric content generated during the interaction. Conventional analysis techniques are time and labor intensive and suffer from reduced accuracy as a result of the subjective nature of the analysis or the limited, discrete selection of descriptors that are available to characterize the interaction.

It is, therefore, an object of the present invention to provide systems and methods that automate the process of characterizing a user-provider interaction by converting the interaction to an alphanumeric content data format and using artificial intelligence and natural language processing ("NPL") technology to generate subject matter identifiers and sentiment identifiers that characterize the interaction. The automated processing classifies, reduces, segments, and filters content data to accurately, automatically, and efficiently characterize the content data. The results of the analysis in turn allow for identification of system and service problems and the implementation of system enhancements.

SUMMARY

According to one embodiment, a system for processing interactive content data generated during a shared experience includes a network computing device having one or more integrated software applications that perform operations to implement the present systems and methods. The operations include passing to a software application service called a content driver software service (for example), content data files. The content data files can be alphanumeric text transcriptions of audio discussions between a user and a provider agent or virtual agent or records of written communication between a user and a provider (e.g., emails, SMS text messages, instant chat messages, or messages sent over a social media platform).

The content data files include communication elements, which can be words, phrases, symbols (e.g., an emoji, trademark logo, etc.), numbers, or other elements of that make up a written communication. The content data files can further include sequencing data, such as times, dates, or other information evidencing the sequence in which a provider-user interaction reflected in the content data files occurred. The content data files can incorporate a variety of other types of content metadata described in detail below.

The content driver software service executes operations that implement a concentration analysis using the content data files. The concentration analysis densifies, or concentrates, the content data files by removing words, phrases, or other communication elements that do not appreciably contribute to later analyses that determine the topics, subjects, call drivers, sentiment, or other useful information characterizing the shared experience represented by the content data.

The result of the concentration analysis can be concentrated content data that consists of those words, phrases, symbols, or other elements that contribute meaningfully to subsequent analyses. The concentration analysis generates concentrated content data for each content data file by determining a weight quantifier for the communication elements in a content data file. The concentration analysis removes from the content data file the communication elements having a weight quantifier below a weight threshold. For other embodiments, the concentration analysis can be omitted such that the subject classification or sentiment analysis (described below) are conducted using the content data files.

The content driver software service executes a subject classification analysis using the concentrated content data. The subject classification analysis relies on NPL and artificial intelligence technology to identify subjects or topics within the content data. The subject analysis also determines interaction driver identifiers for each of the content data files. The interaction identifiers are a subcategory of subject identifiers that focus on characterizing the reasons an end user initiated a shared experience (e.g., to purchase a new service, seek technical support, or ask for assistance in rendering a service).

In one embodiment, the subject classification analysis processes the concentrated content data for each of the content data files to generate an interaction driver identifier for each of the content data files. The interaction driver identifier for each content data file can be associated with the content data file by storing both the content data file and the interaction driver identifier to an interaction database as an interaction database record.

Next, the content driver software service receives a plurality of interaction database records and content parameter data that includes sequencing identifiers. The sequencing identifiers each represent a sequence range, such as a time period over which subject identifier data, interaction driver identifiers, or sentiment identifiers are determined and displayed. For instance, the subject identifiers can be displayed according to a sequencing range representing a given day, week, or month where the sequencing identifier is the name of the day or month or the date of the beginning or end of a particular week.

The content driver software service executes operations that include determining whether each of the interaction database records falls within a sequencing range by processing the sequencing identifiers and the sequencing data for each of the interaction database records. The content driver software service labels the interaction database records with at least one of the sequencing identifiers when the interaction database record falls within at least one of the sequencing ranges (i.e., the interaction database records are labeled according to a day, week, or month).

The content driver software service also processes the interaction driver identifiers for each of the interaction database records within a sequencing range to generate proportion data for each distinct interaction driver identifier. That is, the content driver software service determines the total number of shared experiences or interaction driver identifiers that occurred or are observed within a given time period (called a sequencing range and represented by a sequencing identifier).

The software service next determine the number of times each distinct interaction driver identifier is observed and determines an overall percentage representing how often that interaction driver identifier was observed during the given time period. For instance, the system may determine that the interaction driver identifier of "forgot password" accounts for ten percent (10%) of all user-initiated interactions in a given month. The interaction driver identifiers, the proportion data, and the sequencing identifiers are transmitted to an agent computing device for display on an Interaction Graphical User Interface ("GUI").

The content driver software service can be implemented with a neural network that executes the subject classification analysis. The neural network performs operations that implement a Kmeans clustering analysis to execute the subject classification analysis. The Kmeans clustering analysis is a type of unsupervised learning software processing technique that allows the system to perform without the need for carefully labeled and curated training data, as described in more detail below.

There are various types of neural network architectures that can be used to implement a clustering analysis, and in particular, implement a Kmeans clustering analysis. Suitable neural network architectures include a Hopefield network, a Boltzmann Machine, a Sigmoid Belief Net, a Deep Belief Network, a Helmholtz Machine, a Kohonen Network, a Self-Organizing Map, or a Centroid Neural Network.

In yet other embodiments, the subject classification analysis can be implemented using supervised learning techniques that require training the neural networks with labeled, known training data. The neural network can be, without limitation, a convolutional neural network architecture. The convolutional neural network can be made from at least three intermediate layers and perform operations that implement a Latent Dirichlet Allocation model, which is a type of model commonly used for topic modeling referred to herein as subject classification. As another example, the neural network can be a recurrent neural network having a long short-term memory neural network architecture.

With regard to neural network training, the system can implement supervised learning by performing a labeling analysis on a training set of content data files to generate annotated content data files. That is, the content data files are labeled to ascertain known subjects, interaction drivers, sentiments, or sentiment polarity (discussed below), or other information. The content driver software service then processes the training set of content data files by performing a subject classification analysis that generates training subject classification identifiers, training interaction driver identifiers, sentiment identifiers, or sentiment polarity information. The training subject, interaction driver, sentiment, or polarity classification identifiers are compared against the annotated training set content data files to generate an error rate. The weights of the neural network node formulas (i.e., network parameters) of the neural network are adjusted so as to reduce the error rate. In this manner, the neural network is trained to optimize the parameters that implement the subject classification, sentiment, or other analyses.

The system makes critical information about the shared experiences more accessible to by displaying interaction driver identifiers, subject identifiers, sentiment identifiers, or polarity scores on an Interaction GUI. The Interaction GUI displays the various identifiers according to a one or more sequencing identifiers (i.e., displays the subject, interaction driver, or sentiment identifiers according to a period of time, such as a day, week, or month). That is the Interaction GUI shows the identifiers as associated with the sequencing identifiers by displaying the interaction driver identifier, subject identifier, sentiment identifier, or sentiment polarity as proximal to a sequencing identifier.

The interaction driver identifier, subject identifier, sentiment identifier, or sentiment polarity are also displayed as associated with the proportion data by, for instance, showing percentages or showing the identifiers as part of a pie chart, bar graph, line graph, or other graphical display elements suitable for displaying percentages. As another example, the Interaction GUI can display each interaction driver identifier with a relative size according to the proportion data, such as showing a first graphic element representing 20% as being twice as large as a second graphical element representing 10%.

In one particular use-case, the system can display data from user-provider interactions involving a user that has initiated multiple interactions with the provider, for the same or similar reasons, within a limited time frame. For instance, identifying a user who made multiple calls to technical support in a six week time period. In this manner, the provider is able to identify subjects or interaction drivers that required multiple contacts between a user and a provider and, therefore, could represent problems or issues that are difficult to address.

To further analyze instances of multiple shared experiences, the content data files stored to an interaction database can include a user identifier. The provider network computing device performs the operation of identifying interaction database records having matching user identifiers—i.e., two interactions involving the same customer or end user. The provider network device generates a repeat interaction set that includes those interaction database records having matching user identifiers. Of that set, the provider network computing device then identifies the interaction database records within the repeat interaction set that have matching interaction driver identifiers. The system generates a repeat driver set that is made up of those interaction database records within the repeat interaction set that have matching interaction driver identifiers. In other words, the final data set includes shared experience records where a user called multiple times (i.e., matching user identifiers) for the same reason (i.e., matching interaction driver identifiers).

The system processes the interaction identifiers for all interaction database records within the repeat driver set to generate repeat proportion data for each distinct interaction driver identifier. That is, the system determines the total number of instances involving multiple user-provider interactions within a given time period. Then the number of multiple-instance interactions is determined for each distinct interaction driver identifier, which is divided by the total number of multiple interaction instances to yield a percentage for each interaction driver identifier. The repeat proportion data and the corresponding distinct interaction driver identifiers are transmitted to the agent computing device for display on the Interaction GUI.

In another embodiment, the content data files are generated by recording telephonic communications between a user and an agent and converting the recorded telephonic communications to alphanumeric content data. The telephonic communications are each initiated by an incoming call comprising incoming telephonic interaction data, such as Internet Protocol ("IP") data packets (for a Voice-over-IP call) or multi-frequency tones (for a conventional phone call). A provider system executes an automatic number identification analysis using the incoming telephonic interaction data. The automatic number identification analysis generates incoming telephone number data for each of incoming calls, such as determining a telephone number for an incoming call. The telephone number can be passed as part of a query to an End User database. If, for instance, the end user is a provider customer having an account with the provider, the query can return an end user identifier or other information concerning an end user (assuming the provider previously stored the end user's phone number).

The data resulting from the above-described analyses can be used to identify problems with a provider's system and to implement potential enhancements. For instance, a provider may find that the interaction driver identifiers indicate that customer support calls concerning a provider mobile software application jump from one time period to the next for users attempting to execute an electronic transfer. This in turn indicates that the provider's mobile application electronic transfer function is not operating correctly. The provider has an opportunity to investigate and resolve any problems relating to the electronic transfers.

A provider can also modify its interactive voice response ("IVR") software, which outputs automated options for selection by a user, to include an option for users requiring assistance with the provider mobile application electronic transfer function. Thus, the IVR software is modified to reflect the interaction driver identifiers. As another example, the provider can adjust resource availability for users, such as increasing staffing of agents that are prepared to render assistance with the mobile software application, or requiring agent training on the mobile software application electronic transfer feature.

In other embodiments, the system can be specially adapted to provide yet even more insights into collected content data by performing subject classification, sentiment, and polarity analyses that yield results that are made available to provider personnel. As before, the network computing device optionally performs a concentration analysis on content data files where the content data files include communication elements and sequencing data. The concentration analysis generates concentrated content data for use in subsequent analyses. Alternatively, the various analyses are performed on the content data files.

The network computing device uses the concentrated content data for each content data file to perform a subject classification analysis that generates both (i) one or more subject identifiers, and (ii) subject weighting data for each subject identifier. The subject weighting data is a quantitative measure of the relative importance of the particular subject identifier to the topics addressed within the content data. Put another way, the subject weighting data shows whether one subject identifier was more prevalent or had more relevance to the underlying shared experience than a second subject identifier. The weighting data can be determined by, among other techniques, analyzing the frequency of appearance of certain words or phrases in the content data.

The network computing device can also implement a sentiment analysis using the concentrated content data. The sentiment analysis generates a sentiment identifier for each of the content data files, which is a label representing one or more sentiments reflected in the content data, such as "satisfied," "thankful," "concerned," or "frustrated." The sentiment analysis is likewise executed using NPL and artificial intelligence technology. The system can also perform a polarity analysis that provides a measure of whether the overall sentiment is "positive" or "negative" as reflected in the shared experience represented by the content data.

The network computing device, having determined subject identifiers, sentiment identifiers, and/or polarity transmits the various data to an agent computing device for display. The data transmitted and displayed depends on the dynamic selection of inputs by the agent computing devices. The Interaction GUI on the agent computing device may include an input function that selects a particular layout of data for display on the Interaction GUI, and the data transmitted to the agent computing device varies depending on the selected layout.

The network computing device receives a layout display command that includes layout display selection data transmitted from an agent computing device. The data returned by the network computing device and transmitted to the agent computing device depends on the layout selection data. When the layout display selection data is a subject layout selection, the network computing device processes the layout display command by transmitting subject identifiers, subject weighting data, and sequencing data to the agent computing device for display When the layout display selection data comprises a sentiment layout selection, the network computing device transmits the sentiment identifiers and the sequencing data to the agent user computing device.

Notably, there may be a significant number of distinct subject, sentiment, or interaction driver identifiers generated during the analyses. It might be desirable, however, to display only a discrete number of identifiers on the Interaction GUI or other interface, such as the top five subject identifiers having the highest subject weighting data or highest proportion data. The network computing device utilizes processing techniques to identify a subset of subject identifiers, interaction driver identifiers, or sentiment identifiers, and the network computing device transmits only the subset of identifiers to the agent computing device for display.

To select a subset of available data, the network computing device executes operations that include aggregating, across all of the content data files processed by the subject classification analysis, the number of times each distinct subject identifier occurs or is observed. The total number of shared experiences represented by the content data files is also determined. The network computing device determines number of times each distinct subject matter identifier is observed as a proportion of the overall number of shared experiences or subject identifiers, thereby determining proportion data. A similar process is used to determine proportion data for the sentiment identifiers or interaction driver identifiers. That is, the number of times each distinct interaction driver or sentiment identifier appears in a sequencing range is determined and divided by the number of shared experiences within the same sequencing range.

In another embodiment, the above system labels the subject and sentiment identifiers according to the sequencing identifiers to ensure that the subject and sentiment identifiers are associated with the appropriate time frame. The network computing device receives content parameter data that includes one or more sequencing identifiers that each represent a sequence range. The network computing device determines whether each of the content data files falls within a sequencing range by processing the content data files and the sequencing data. The system labels the content identifiers when the sequencing data for the provider system falls within at least one of the sequencing ranges (i.e., by day, week ending, or month).

The network computing device can be implemented with a neural network that executes the subject classification analysis. The neural network performs operations that implement a Kmeans clustering analysis to execute the subject classification analysis. There are various types of neural network architectures that can be used to implement a clustering analysis, and in particular, implement a Kmeans clustering analysis. Suitable neural network architectures include a Hopefield network, a Boltzmann Machine, a Sigmoid Belief Net, a Deep Belief Network, a Helmholtz Machine, a Kohonen Network, a Self-Organizing Map, or a Centroid Neural Network.

In yet other embodiments, the subject classification analysis can be implemented using supervised learning techniques. The neural network can be, without limitation, a convolutional neural network architecture, made from at least three intermediate layers, that executes operations that implement a Latent Dirichlet Allocation model. As another example, the neural network can be a recurrent neural network having a long short-term memory neural network architecture.

In some embodiments, the network computing device can implement multiple neural networks that execute different software processing techniques, such as a first neural network that is used to execute the subject classification analysis and a second neural network that is used to execute the sentiment analysis. The first neural network can execute operations that implement a Kmeans clustering analysis to perform the subject classification analysis. The second neural network can implement the sentiment analysis using neural networks that implement supervised learning software processing techniques, such as convolutional or recurrent neural networks.

The subject identifiers, interaction driver identifiers, sentiment identifiers and polarity data are transmitted to the agent computing device for display on the Interaction GUI. The Interaction GUI can render the subject, sentiment, and interaction driver identifiers according to the proportion data. For instance, the Interaction GUI can render the identifiers according to various geographic shapes or elements on graphs or charts. The shapes or other elements can be displayed with relative sizing corresponding to the proportion data where, for example, identifiers having higher proportion data are shown as being larger while identifiers with less proportion data are smaller. The Interaction GUI can likewise display subject identifiers according to the subject weighting data where, for instance, identifiers having higher weighting data are displayed as being larger or occupying a relatively higher position on a graph or chart.

The systems disclosed herein can also be used for real-time monitoring of shared experiences. That is, the provider system captures content data from an ongoing interaction between a user and a provider and determines the subjects being addressed during the interaction, the interaction drivers, and the sentiment identifiers. The system monitors the polarity of the sentiment as being positive or negative, for example. If the sentiment falls below or above a specified threshold, such as the sentiment becoming too negative or the end user or agent becoming too frustrated, an alert can be routed to an agent computing device. The agent computing device receiving the alert can be a primary agent, such as an agent supervisor or manager, that has the ability to assist.

The alert routed to the agent computing device can include data about the customer or the ongoing interaction, such as subject identifiers, sentiment identifiers, agent data (e.g., name, experience level of the agent), and customer data (e.g., name of the customer, the types of products or accounts held with the provider, if any, or location of the customer). The alert can be routed to a particular agent that is most capable of assisting, as determined through artificial intelligence technology. That is, the system can perform a routing analysis using, for instance, agent data, customer data, or information relating to the shared experience. As an example, the routing analysis can ascertain an agent that has relevant training or experience that makes the agent most likely to successfully resolve any problems arising during the interaction, as determined by the subject identifiers or interaction driver identifiers.

In one embodiment, the provider network computing device passes user source data (e.g., a telephone number, device IP address, or email) to an End User Database as part of a query. If the user is an existing provider customer, the query returns end user data that includes a user identifier (i.e., a name or account name), the user's geographic location (i.e., where the user is calling from or where the user resides), or information relating to the products held by a user, among other relevant data.

The provider system captures and data from the ongoing provider-user interaction, such as recording audio data from a telephone call or storing written messages exchanged through an instant messaging chat software application. The captured data is transcribed (for audio data) and stored as content data files for the ongoing interaction. The network computing device can optionally perform a concentration analysis on the content data file that determines a weight quantifier for each communication element, such as a word, phrase, symbol, or numeric value. The concentration analysis removes from the content data file those communication elements having a weight quantifier below a specified weight threshold. In this manner, the content data is densified or concentrated such that the remaining communication elements are more likely to contribute to the subject or sentiment of the content.

The provider network computing device executes a subject identification analysis using the concentrated content data (or using the content data files if no concentration analysis is used) to generate an interaction driver identifier or subject identifier for the content data files. The system also executes a polarity analysis using the concentrated content data (or content data files) to generate polarity data for the ongoing shared experience. The system determines whether the polarity data falls below a specified polarity threshold. If the polarity data falls below the polarity threshold, the network computing device transmits an interaction alert that includes alert data to a primary agent computing device. The primary agent computing device displays the interaction alert and the alert data, which can include end user data, an agent identifier, and an interaction driver identifier.

The system can include a source identification software service that receives incoming interaction initialization data when the provider-user interaction is initiated. The interaction initialization data can be, for example, a user device IP address, an email address, or multi-frequency tone information generated during an incoming telephone call. For conventional telephone calls, the source identification software service executes an automatic number identification analysis utilizing the incoming interaction initialization data to determine the user source data (i.e., the user telephone number). The user source data is used to determine an identity of the user, if available, by querying the End User Database.

In addition to the content data files or concentrated content data, the subject classification analysis can utilize the captured end user data to make a determination about the subjects of an interaction or the drivers of an interaction (i.e., why the user initiated contact with the provider to seek support services). The end user data might indicate, for example, that the user recently purchased a new product, which factors into the likelihood that the user is contacting a provider regarding the new product.

In other cases, the subject classification analysis can utilizes data from prior shared experiences involving the same user. If the user has contacted a provider multiple times to request an electronic transfer, that data may factor into the potential subject identifiers or interaction driver identifiers. The system can include an interaction database having interaction database records that include content data files and interaction driver identifiers generated from prior shared experiences between a provider and a plurality of end users. The network computing device retrieves the interaction database records from the interaction database, and utilizes the interaction database records to generate interaction driver identifier.

In another aspect of the real-time monitoring embodiment, the system can execute a sentiment analysis using the concentrated content data to generate a sentiment identifier. The sentiment identifier is transmitted to the primary agent computing device with the interaction alert. The provider network computing device can implement a first neural network that is used to execute the subject classification analysis and a second neural network that is used to execute the sentiment analysis.

As in other embodiments, the neural network executing the subject classification analysis performs operations that implement a Kmeans clustering analysis to execute the subject classification analysis. The neural network architectures used to implement the clustering analysis can include a neural network architecture selected from one of a Hopefield network, a Boltzmann Machine, Sigmoid Belief Net, a Deep Belief Network, a Helmholtz Machine, a Kohonen Network, a Self-Organizing Map, or a Centroid Neural Network. The neural networks implementing the subject classification, sentiment analysis, or routing analysis can also use supervised learning techniques and architectures that include convolutional or recurrent neural networks. Moreover, the analyses can be implemented using the same of different neural networks with varying architectures, such as where a first neural network implements the subject classification analysis, a second neural network implements the polarity analysis or sentiment analysis, and a third neural network implements the routing analysis.

To execute a routing analysis, the network computing device can pass a query containing agent identifiers of available agents to an agent identity management service. The agent identity management service can be a database or software service that stores information relating to provider agents. In response to the query, the network computing device can receive agent attribute data, such as data relating to the training, experience level or role of particular agents. The routing analysis utilizes the agent attribute data to generate an optimal agent identifier. The optimal agent identifier can represent an IP address, name, or other information that identifies an agent qualified to assist with a particular shared experience. The interaction alert is then transmitted to an agent computing device associated with the optimal agent identifier.

In another embodiment, the system is disclosed for generating a graphical user interface for dynamic selection and display of interactive content data. The system includes at least one computing device having one or more integrated software applications that perform operations that implement the disclosed systems and methods. The system generates the Interaction GUI using an interaction interface software service. The Interaction GUI displays (i) one or more subject identifiers, (ii) one or more sentiment identifiers, and/or (iii) polarity data. The subject identifiers can also be interaction driver identifiers.

The Interaction GUI also displays sequencing identifiers for each subject, sentiment, or interaction driver identifier. The sequencing identifiers correspond to a time duration, such as a given day, month, or year, over which the identifier data is displayed. Thus, the subject, sentiment, or interaction driver identifiers reflected in content data are shown as a function of time with, for example, the most common subjects or sentiments displayed on a per day, per week, or per month basis, or another suitable date range or time.

The Interaction GUI also includes functions that allow users to toggle between displaying subject identifiers or sentiment identifiers, and to display the identifiers according to varying time durations. More specifically, the Interaction GUI includes an Attribute Layout Selection input function that can be selected as a "Subject View" or a "Sentiment View" to display either subject identifiers or sentiment identifiers. The Interaction GUI also includes a Sequencing View input function that allows users to select a duration over which the identifier data is displayed.

The Interaction GUI can represent the identifiers with graphical elements, words, or phrases. For instance, the Interaction GUI can show the subject or sentiment identifiers as part of a bar graph where segments, or elements, of the bar graph represent individual identifiers. In other embodiment, the subject or sentiment identifiers are displayed as part of a "word cloud." The word cloud displays words or phrases representing the various identifiers where the words have varying sizes and positioning depending on proportion data or weighting data.

Selecting the Attribute Layout Selection input function causes the interaction interface software service to generate a layout selection command that is transmitted to a provider computing device to request display data for display on the Interaction GUI. The layout selection command includes (i) layout display selection data (i.e., a choice between subject identifiers and sentiment identifiers), and (ii) sequencing view data (i.e., displaying between various time periods). The interaction interface software service passes the layout selection command to a provider computing device.

The provider computing device processes the layout selection command and returns data that depends on the selections reflected in the layout display selection data. More specifically, when the layout display selection data comprises a subject layout selection (i.e., the Subject View option is selected), the provider computing device transmits display data to the interaction interface software service that includes one or more subject identifiers. For each of the subject identifiers, the display data includes corresponding subject proportion data and a sequencing identifier. The interaction interface software service renders the display data on the Interaction GUI. When the layout display selection data comprises a sentiment layout selection (i.e., the Sentiment View option is selected), the provider computing device transmits display data to the interaction interface software service that includes one or more sentiment identifiers and sentiment proportion data for each sentiment identifier.

In one embodiment, the subject proportion data is displayed on the Interaction GUI by displaying each subject identifier with a relative size according to the subject proportion data. In another embodiment, each of the one or more subject identifiers is displayed as an element of a bar graph where the size of the elements varies according to the subject proportion data. The subject proportion data can be processed and displayed as a numeric value (e.g., a percentage) for each of the one or more subject identifiers. Each of the one or more sequencing identifiers corresponds to a distinct time period, such that the bars or other graphical elements are rendered proximal to a specified time duration on the Interaction GUI.

For embodiments displaying the identifiers as word clouds, the one or more subject identifiers are displayed on the Interaction GUI as descriptor sets where each subject identifier is a descriptor within the descriptor set. The subject proportion data is displayed on the Interaction GUI by displaying each descriptor with a relative size according to the subject proportion data. Further, each descriptor set is associated with a sequencing identifier by displaying the descriptor sets proximal to a sequencing identifier.

When the interface data transmit command includes a sentiment layout selection, the provider computing device returns sentiment identifiers and sentiment proportion data for display on the Interaction GUI. The sentiment proportion data is displayed on the Interaction GUI by displaying each sentiment identifier with a relative size according to the sentiment proportion data. Similarly, when the interface data transmit command includes a subject layout selection, the provider computing device can return a subject identifier along with subject weighting data. The subject weighting data is displayed on the Interaction GUI by displaying each subject identifier with a relative size according to the subject weighting data.

BRIEF DESCRIPTION OF THE DRAWINGS

Features, aspects, and advantages of the present invention are better understood when the following detailed description of the invention is read with reference to the accompanying figures, in which.

DETAILED DESCRIPTION

Figure 1:
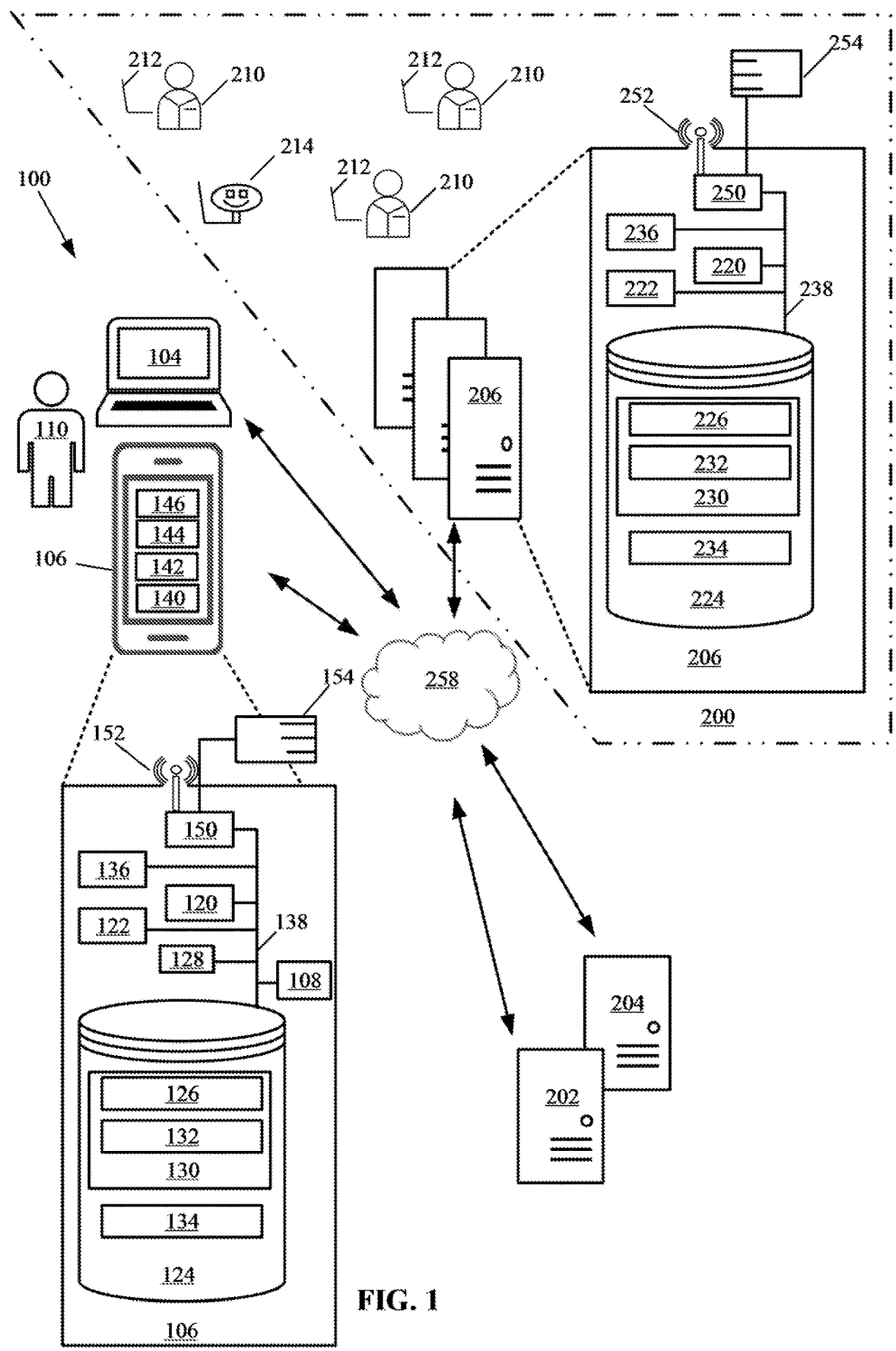
FIG. 1 is an example system diagram according to one embodiment.

The present invention will now be described more fully hereinafter with reference to the accompanying drawings in which example embodiments of the invention are shown. However, the invention may be embodied in many different forms and should not be construed as limited to the representative embodiments set forth herein. The exemplary embodiments are provided so that this disclosure will be both thorough and complete and will fully convey the scope of the invention and enable one of ordinary skill in the art to make, use, and practice the invention. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

It will be understood that relative terms are intended to encompass different orientations or sequences in addition to the orientations and sequences depicted in the drawings and described herein. Relative terminology, such as "substantially" or "about," describe the specified devices, materials, transmissions, steps, parameters, or ranges as well as those that do not materially affect the basic and novel characteristics of the claimed inventions as whole (as would be appreciated by one of ordinary skill in the art).

The terms "coupled," "fixed," "attached to," "communicatively coupled to," "operatively coupled to," and the like refer to both: (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

As used herein, the terms "enterprise" or "provider" generally describes a person or business enterprise that hosts, maintains, or uses the disclosed systems and methods. The term provider generally describes the person or business enterprise providing goods or services. Interactions between a provider and its customers or users, can be referred to as a "shared experience." Shared experiences result in the generation of content data through the exchange of verbal or written communications and expressions of ideas that are converted to, and stored as, content data files. Shared experiences can include, for example, sales calls or a provider rendering customer support services to a customer, such as technical support.

The term "customer support" is used interchangeably with the terms support services, support, support requests, customer service, customer interactions, helpdesk requests, or a shared experience. Customer support generally includes, but is not limited to, providing customers with assistance in utilizing existing products and services and with purchasing additional products and services. The term "agent" generally describes an individual who interfaces with the customer to provide services using the systems and methods described herein, and the term is used interchangeably with the terms associate or representative. The term "primary agent" refers to, and is used interchangeably with, the terms "supervisor" or "manager." The term primary agent is intended to refer to a provider agent or personnel that has supervisory authority over other provider agents and personnel. Such primary agents can be called to intervene in a customer interaction to provide assistance that expedites the interaction or resolves problems.

The term "user" is used interchangeably with the terms end user, customer or consumer and represents individuals to whom a provider is rendering goods or services or individuals, with whom the provider has an ongoing relationship, and who contact a provider by telephone, video chat, email, text, or an instant message software application to request assistance with provider products and services. The term "participants" is used interchangeably with the term "content sources" and refers to humans or automated software technology (e.g., a chat bot) that generate linguistic expressions of ideas that can be processed using artificial intelligence and natural language processing technologies. For instance, content sources can include an agent and a customer or end user generating content data as part of a shared experience.

The term "content" is used to generally refer to alphanumeric text in digital form and can be used interchangeably with the terms alphanumeric content data, alphanumeric text content, alphanumeric textual content data, content data, textual content data, textual data, and text content data. These terms for content can be used interchangeably with the term "transcript data" where the terms are being used to refer to a written digital record, in text form, of a single speaker or a written or verbal interaction between multiple participants in a conversation or discussion. Content can be generated by transcribing an oral interaction during a shared experience by telephone or video conference, or generated during written exchanges by email, instant "chat" messaging, short message service ("SMS"), or messages exchanged through various online platforms or social media software applications.

Embodiments are described with reference to flowchart illustrations or block diagrams of methods or apparatuses where each block or combinations of blocks can be implemented by computer-readable instructions (i.e., software). The term apparatus includes systems and computer program products. The referenced computer-readable software instructions may be provided to a processor of a general purpose computer, special purpose computer, or other programmable data processing apparatus to produce a particular machine. The instructions, which execute via the processor of the computer or other programmable data processing apparatus, create mechanisms for implementing the functions specified in this specification and attached figures.

The computer-readable instructions are loaded onto a computer or other programmable data processing apparatus to cause a series of operational steps to be performed on the computer or other programmable apparatus to produce a computer-implemented process such that the instructions, which execute on the computer or other programmable apparatus, provide steps for implementing the functions specified in the attached flowchart(s) or block diagram(s). Alternatively, computer software implemented steps or acts may be combined with operator or human implemented steps or acts in order to carry out an embodiment of the disclosed systems and methods.

The computer-readable software instructions may also be stored in a computer-readable memory that can direct a computer or other programmable data processing apparatus to function in a particular manner. In this manner, the instructions stored in the computer-readable memory produce an article of manufacture that includes the instructions, which implement the functions described and illustrated herein.

Disclosed are systems and methods for automatically processing alphanumeric content data by reducing, classifying, and segmenting alphanumeric text content using artificial intelligence and natural language processing technology. The example embodiments discussed herein are generally described with reference to content data generated from a transcript of a written or verbal interactive exchange between conversation participants or "content sources." Examples of content data include, but are not limited to, an exchange of instant chat messages between two or more participants or recorded audio data generated during a telephone call (e.g., a consumer support request or help desk call), or a video conference. Those of skill in the art will appreciate that the example embodiments are not intended to be limiting, and the systems and methods can be applied to other types of alphanumeric content data.

The content data is analyzed using natural language processing techniques that are implemented by artificial intelligence technology. The resulting outputs can include, without limitation: (i) the identities of conversation participants or "content sources;" (ii) a list of subjects addressed within the content data and that identify the reasons or "driver" for why a customer initiated a shared experience; (iii) weighting data showing the relative importance or engagement associated with certain subjects; and (iv) frequency data defining the proportion of shared experiences that relate to a particular subject identifier or driver for a support request.

The embodiments discussed in this specification are described with reference to systems and methods utilized in a call center environment where provider personnel are engaging in shared experiences and performing customer service activities. However, those of ordinary skill in the art will appreciate that the disclosed systems and methods are not limited to use in a call center environment or use in performing customer service activities. Rather, the systems and methods are generally applicable in other contexts where system end users seek to analyze large volumes of alphanumeric content data to identify particular subjects or drivers of the interaction.

System Level Description

As shown in FIG. 1, a hardware system 100 configuration according to one embodiment generally includes a user 110 that benefits through use of services and products offered by a provider through an enterprise system 200. The user 110 accesses services and products by use of one or more user computing devices 104 & 106. The user computing device can be a larger device, such as a laptop or desktop computer 104, or a mobile computing device 106, such as smart phone or tablet device with processing and communication capabilities. The user computing device 104 & 106 includes integrated software applications that manage device resources, generate user interfaces, accept user inputs, and facilitate communications with other devices, among other functions. The integrated software applications can include an operating system, such as Linux®, UNIX®, Windows®, macOS®, iOS®, Android®, or other operating system compatible with personal computing devices.

The user 110 can be an individual, a group, or an entity having access to the user computing device 104 & 106. Although the user 110 is singly represented in some figures, at least in some embodiments, the user 110 is one of many, such as a market or community of users, consumers, customers, business entities, government entities, and groups of any size.

The user computing device includes subsystems and components, such as a processor 120, a memory device 122, a storage device 124, or power system 128. The memory device 122 can be transitory random access memory ("RAM") or read-only memory ("ROM"). The storage device 124 includes at least one of a non-transitory storage medium for long-term, intermediate-term, and short-term storage of computer-readable instructions 126 for execution by the processor 120. For example, the instructions 126 can include instructions for an operating system and various integrated applications or programs 130 & 132. The storage device 124 can store various other data items 134, including, without limitation, cached data, user files, pictures, audio and/or video recordings, files downloaded or received from other devices, and other data items preferred by the user, or related to any or all of the applications or programs.

The memory device 122 and storage device 124 are operatively coupled to the processor 120 and are configures to store a plurality of integrated software applications that comprise computer-executable instructions and code executed by the processing device 120 to implement the functions of the user computing device 104 & 106 described herein. Example applications include a conventional Internet browser software application and a mobile software application created by the provider to facilitate interaction with the provider system 200.

According to various embodiments, the memory device 122 and storage device 124 may be combined into a single storage medium. The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The integrated software applications also typically provide a graphical user interface ("GUI") on the user computing device display screen 140 that allows the user 110 to utilize and interact with the user computing device. Example GUI display screens are depicted in the attached figures. The GUI display screens may include features for displaying information and accepting inputs from users, such as text boxes, data fields, hyperlinks, pull down menus, check boxes, radio buttons, and the like. One of ordinary skill in the art will appreciate that the exemplary functions and user-interface display screens shown in the attached figures are not intended to be limiting, and an integrated software application may include other display screens and functions.

The processing device 120 performs calculations, processes instructions for execution, and manipulates information. The processing device 120 executes machine-readable instructions stored in the storage device 124 and/or memory device 122 to perform methods and functions as described or implied herein. The processing device 120 can be implemented as a central processing unit ("CPU"), a microprocessor, a graphics processing unit ("GPU"), a microcontroller, an application-specific integrated circuit ("ASIC"), a programmable logic device ("PLD"), a digital signal processor ("DSP"), a field programmable gate array ("FPGA"), a state machine, a controller, gated or transistor logic, discrete physical hardware components, and combinations thereof. In some embodiments, particular portions or steps of methods and functions described herein are performed in whole or in part by way of the processing device 120. In other embodiments, the methods and functions described herein include cloud-based computing such that the processing device 120 facilitates local operations, such communication functions, data transfer, and user inputs and outputs.

or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

The user computing device 104 & 106 may also include a positioning device 108, such as a global positioning system device ("GPS") that determines a location of the user computing device. In other embodiments, the positioning device 108 includes a proximity sensor or transmitter, such as an RFID tag, that can sense or be sensed by devices proximal to the user computing device 104 &106.

The input and output system 136 may also be configured to obtain and process various forms of authentication via an authentication system to obtain authentication information of a user 110. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display, for example, selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

A system intraconnect 138, such as a bus system, connects various components of the mobile device 106. The user computing device 104 & 106 further includes a communication interface 150. The communication interface 150 facilitates transactions with other devices and systems to provide two-way communications and data exchanges through a wireless communication device 152 or wired connection 154. Communications may be conducted via various modes or protocols, such as through a cellular network, wireless communication protocols using IEEE 802.11 standards. Communications can also include short-range protocols, such as Bluetooth or Near-field communication protocols. Communications may also or alternatively be conducted via the connector 154 for wired connections such by USB, Ethernet, and other physically connected modes of data transfer.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210 act on behalf of the provider, such as customer service representatives, advisors, managers, and sales team members.

Human agents 210 utilize agent computing devices 212 to interface with the provider system 200. The agent computing devices 212 can be, as non-limiting examples, computing devices, kiosks, terminals, smart devices such as phones, and devices and tools at customer service counters and windows at POS locations. In at least one example, the diagrammatic representation and above-description of the components of the user computing device 104 & 106 in FIG. 1 applies as well to the agent computing devices 212. As used herein, the general term "end user computing device" can be used to refer to either the agent computing device 212 or the user computing device 110 depending on whether the agent (as an employee or affiliate of the provider) or the user (as a customer or consumer) is utilizing the disclosed systems and methods to segment, parse, filter, analyze, and display content data.

Human agents 210 interact with users 110 or other agents 212 by phone, via an instant messaging software application, or by email. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components, such as a processor device 220, an input-output system 236, an intraconnect bus system 238, a communication interface 250, a wireless device 252, a hardwire connection device 254, a transitory memory device 222, and a non-transitory storage device 224 for long-term, intermediate-term, and short-term storage of computer-readable instructions 226 for execution by the processor device 220. The instructions 226 can include instructions for an operating system and various software applications or programs 230 & 232. The storage device 224 can store various other data 234, such as cached data, files for user accounts, user profiles, account balances, and transaction histories, files downloaded or received from other devices, and other data items required or related to the applications or programs 230 & 232.

The network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations.

The network 258 may be or include an enterprise or secured network, or may be implemented, at least in part, through one or more connections to the Internet. A portion of the network 258 may be a virtual private network ("VPN") or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100.

External systems 270 and 272 represent any number and variety of data sources, users, consumers, customers, enterprises, and groups of any size. In at least one example, the external systems 270 and 272 represent remote terminal utilized by the enterprise system 200 in serving users 110. In another example, the external systems 270 and 272 represent electronic systems for processing payment transactions. The system may also utilize software applications that function using external resources 270 and 272 available through a third-party provider, such as a Software as a Service ("SasS"), Platform as a Service ("PaaS"), or Infrastructure as a Service ("IaaS") provider running on a third-party cloud service computing device. For instance, a cloud computing device may function as a resource provider by providing remote data storage capabilities or running software applications utilized by remote devices.

SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

The embodiment shown in FIG. 1 is not intended to be limiting, and one of ordinary skill in the art will appreciate that the system and methods of the present invention may be implemented using other suitable hardware or software configurations. For example, the system may utilize only a single computing system 206 implemented by one or more physical or virtual computing devices, or a single computing device may implement one or more of the computing system 206, agent computing device 206, or user computing device 104 & 106.

Capturing Content Data and Content Metadata

The provider system can be configured to generate content data manually or to obtain content data from a third party source, such as a cloud storage service or remote database. To generate content data manually, a provider agent utilizes a computing device to accesses a remote third party system to download audio data or alphanumeric text data representing written communications between a user and a provider agent or a transcription of an oral discussion.

A provider agent accesses the third party system using a software application compatible with the third party system that can be integrated with the agent computing device, such as an integrated mobile software application or an application programmable interface ("API") software application that facilitates communication between software and systems by mapping computer-readable commands and data formats between systems. In another embodiment, the agent computing device accesses the third party system using an Internet browser software application to access a web-based software interface.

Provider-user interactions generally commence when a user initiates contact with a provider by telephone or written electronic communication (e.g., email, SMS text message, an instant chat message, or a social media message). The content data can take the form of written electronic communications, or content data can be generated by recording and transcribing telephonic communications between a user and a provider system or agent. Captured audio data is stored to the provider system and transcribed into alphanumeric text data using a speech-to-text software application and stored as content data files comprising content data. In some embodiments, the speech-to-text conversion is performed by a third party, and the provider system downloads and stores the alphanumeric content data directly from the remote third party source.

The content data can be stored directly to a provider system or stored to a third party database, such as a cloud service storage or software as a service provider. The content data is stored to a relational database that maintains the content data in a manner that permits the content data files to be associated with certain information, such as one or more subject identifiers and content metadata. Storing to a relational database further facilitates expedient sorting of the data, such as retrieving content data having time and date data (called "sequencing data") within a predefined range of dates.

The content data can be associated with one or more categories of content metadata and stored as content data files to an Interaction Database on the provider system. Content metadata can include, for example: (i) sequencing data representing the date and time when the content data was created or otherwise representing an order or sequence in which a shared experience reflected in the content data occurred relative to other shared experiences; (ii) subject identifier data that characterizes the subjects or topics addressed within the content data (e.g., "technical support" or "new product launch demonstration"); (iii) interaction driver identifier data, which can be a subset or subcategory of subject identifier data, and that identifies the reasons why a shared experience was initiated (i.e., the reason a customer initiated the interaction can be, and typically is, a subject or topic addressed within the content data); (iv) weighting data representing the relative importance of subject identifiers through, for example, an analysis of the frequency of communication elements contributing to the subject identifier; (v) content source identifier data that identifies one or more participants to the interaction, which can include a name, an affiliated employer or business, or a job title or role and can further comprise agent identifier data or user identifier data that identifiers an agent or customer by name or identification number; (vi) provider identifier data that identifies owner of the content data; (vii) user source data, such as a telephone number, email address, or user device IP Address; (viii) sentiment data, including sentiment identifiers; (ix) polarity data indicating the relative positive or negative degree of sentiment occurring during a shared experience; (x) resolution data indicating whether a particular user issue was resolved or not, and if so, how the issue was resolved (e.g., the issue is a user forgot a password, and the resolution was a password reset); (xi) an agent identifier indicating the provider agent that participated in the shared experience; or (xii) other types of data useful for provider service to a user or processing content data.

Provider-user interactions generally commence when a user contacts a provider through an incoming interaction request. The incoming interaction request includes incoming interaction initialization data, which can be multi-frequency signal tones or data packets representing a user device IP address, email address, or digital routing information. The provider system includes a source identification software service that processes the incoming interaction initialization data to generate user source data, such as a telephone number, a user device Internet Protocol ("IP") Address, an email address, or a social media or other account name.

The source identification software service determines the telephone number of the incoming call source as incoming telephone number data using techniques that can include, for example, automatic number identification ("ANI"). In that case, the incoming interaction initialization data can be ANI data, which is generally transmitted along with an incoming telephone call using multi-frequency signaling, which can be a digital tone that is translated to a numeric value. For Voice-over-Internet Protocol ("VoIP") calling, the incoming telephone number can instead be received as packets of digital information within the incoming interaction initialization data. The source identification software service processes the incoming interaction initialization data (i.e., the ANI data or IP data packets) to determine the source data as incoming telephone number data. The provider system uses the incoming telephone number data to query an internal End User Database to determine whether the incoming telephone number corresponds to an existing provider customer.

When a user initiates a provider-user interaction by communicating with a provider through written electronic communications or VoIP, the communications originate from a user computing device, such as a personal computer, a smart phone, or tablet computing device. In that instance, the source identification software service processes the incoming initialization data to capture or determine user source data that can include a user device IP address for the user computing device, an email address, or a social media or other account name.

The provider system utilizes the user source data to transmit a query to the provider's internal End User Database to determine if an existing database record matches user source data. In this manner, either the incoming telephone number, the user device IP address, email address, or other user source data is used to determine to identity of the end user and whether the user is a current or former provider customer.

The End User Database comprises database records that correspond to individual customers, or end users. The end user database records store a variety of end user data, including, without limitation: (i) a user identifier; (ii) user contact data, including a mailing address or a geographic region where the user resides (e.g., a zip code, city, state); (iii) user source data, such as user telephone number data, user device IP Address data, an email address, or a social media account name; (iv) user demographic data, including the gender and age of a user; (v) one or more product identifiers that indicate the accounts or products currently held by a user (e.g., a checking account, a home loan, brokerage account, etc.); (vi) user resource availability data (e.g., balances for various product types or account types associated with, or held by, a user); (vii) average resource availability data that indicates the average value of products or account balances maintained by the user over a given time period (e.g., an average monthly balance for an account held by the user); (viii) transaction data that includes data and information relating to user transactions, such as payment amounts, dates when a transaction occurred, data that identifies other parties to the transaction (i.e., a payment recipient), and information identifying a category of expenditures for the transaction (i.e., groceries, transportation, etc.); (ix) average resource utilization volume data indicating the average number of transactions a user conducts using a given product over a given time period (e.g., the number of resource expenditures per month for a given account or accounts); (x) user online activity data indicating user attempts to log into the provider system to access user accounts or other activities performed by users online or through a dedicated mobile device software application; or (xi) system configuration data, as described below.

The End User Database can also include interaction activity data that in part overlaps with data stored to the Interaction Database. That is, the interaction activity data represents information characterizing prior shared experiences between the particular user and the provider, such as a history of user calls to a provider seeking technical support assistance. In particular, the interaction activity data can include, without limitation: (i) sequencing data; (ii) subject identifier data; (iii) interaction driver identifier data; (iv) sentiment data; (v) polarity data; (vi) user source data (e.g., did the user utilize a telephone, email, or other means to initiate the interaction); (vii) an agent identifier; and (viii) resolution data.

The provider system can further determine geographic location data based on the incoming telephone number data or user device IP address. The provider system can include a software application that transmits the incoming telephone number data or the user device IP address to an Identity & Location API that utilizes the phone number or IP Address to determine the approximate geographic location of the user computing device. The Identity & Location API can pass the incoming telephone number or user device IP address to a database or a third-party software service that returns geographic location data corresponding to an approximate geographic location for the telephone number or the user device IP address, such as a city, county, or state. The Identity & Location API stores the geographic data to a database record with the content data.

When users access a provider system through a user computing device, the provider system can capture additional elements of end user data. That is, end user data is captured when a user computing device is used to access the provider system to request data to be displayed on the user computing device. User computing devices access the provider system using an Internet browser software application to access the web server to display a provider webpage. Alternatively, user computing devices access the provider system through a provider mobile software application that displays GUI screens.

In accessing the provider system, the user computing device transmits a user interface transmit command to the web server that can include: (i) the device IP address for the user computing device; (ii) navigation data; and (iii) system configuration data. In response to the user interface transmit command, the web server returns provider display data and a digital cookie that is stored to the user computing device and used to track functions and activities performed by the user computing device. After receiving provider display data, the user computing device processes the display data and renders GUI screens presented to users, such as a provider website or a GUI within a provider mobile software application. Note that in some embodiments, the navigation data and system configuration data may be sent to the provider system in a separate message subsequent to the user interface transmit command message.

Navigation data transmitted by the user computing device generally includes information relating to prior functions and activities performed by the user computing device. Examples of navigation data include: (i) navigation history data (i.e., identifiers like website names and IP addresses showing websites previously access by the user computing device); (ii) redirect data (i.e., data indicating whether the user computing device selected a third-party universal resource locator ("URL") link that redirected to the provider web server); and (iii) search history data (e.g., data showing keyword searches in a search engine, like Google® or Bing®, performed by the user computing device).

Navigation history data allows a provider to determine whether a user computing device was previously used to visit particular websites, including the provider's own website. The navigation history data further indicates whether the user computing device accesses relevant third-party websites, such as websites that contain information concerning a particular product or service or websites that provide technical and other information relevant to resolving a problem experienced by a user. The navigation history data includes, without limitation: (i) URL data identifying a hyperlink link to the website; (ii) website identification data, such as a title of a visited website; (iii) website IP address data indicating an IP address for a web server associated with a visited website; and (iv) time stamp data indicating the date and time when a website was accessed.

Search history data is generated when a user computing device runs a query within a search engine. The search history data can include, without limitation: (i) a search engine identifier indicating the search engine that was utilized; (ii) search parameter data indicating the alphanumeric strings or operators used as part of a search query (e.g., Boolean operators such as "AND" or "OR" or functional operators, like "insite" used to search the contents of a specific website); and (iii) time stamp data indicating the date and time a search was performed.

The user computing device may also transmit system configuration data to the provider system that is used to evaluate a user or authenticate the user computing device. System configuration data can include, without limitation: (i) a unique identifier for the user computing device (e.g., a media access control ("MAC") address hardcoded into a communication subsystem of the user agent computing device); (ii) a MAC address for the local network of a user computing device (e.g., a router MAC address); (iii) copies of key system files that are unlikely to change between instances when a user accesses the provider system; (iv) a list of applications running or installed on the user computing device; and (v) any other data useful for evaluating users and ascertaining the subject identifiers underlying a support request or user communication.

With respect to the agent attribute data, the provider system can include, for example, an Agent Identity Management Service ("Agent IdM") software application that stores and captures a variety of information relating to provider agents. Agent attribute data can include, without limitation: (i) an agent login username, which is a username the agent entered to log into the end user computing device; (ii) an agent identifier, such as an employee number or name, that identifies the agent and that is independent of the software applications or computing devices being utilized; (iii) the agent computing device Internet Protocol address ("IP Address"); (iv) agent service line identifier data indicating a provider department, branch, or division to which an agent is assigned; (v) an agent role designation (e.g., junior agent, senior agent, supervisor, etc.); (vi) agent location data for the agent computing device indicating, for example, a geographic location where the agent computing device is located or a residential address for the agent; (vii) agent experience data indicating the duration of professional experience an agent has in one or more relevant roles or in working for a provider (e.g., 2 years' experience in new account creation or 5 years and 2 months working for the provider overall); and (vii) agent training data indicating particular certifications, products, or services that an agent is trained to handle (e.g., an agent is qualified to provide technical support for a provider mobile application, or the agent is qualified to offer advice concerning a particular product or service).

A content driver software service processes the content data to identify subjects addressed within the content data, source identifiers (e.g., names of conversation participants), sentiment data, and weighting data indicating the relative importance of subjects, content sources, and interrogatories. The data and information generated by the content driver software service can output to graphical user interfaces that make the content data more accessible to provider personnel and that reveal analytical insights that can be used to identify and resolve potential problems or design and implement system enhancements. The content driver software service can be implemented by a separate, dedicated computing device, or implemented as an integrated software application running on a computing device that is also running other applications (e.g., a network server).

As discussed below, a content driver software service processes the content data using a subject classification analysis to determine one or more subject identifiers that represent topics addressed within the content data. Non-limiting examples can be subject identifiers relating to a particular provider product or service.

Natural Language Processing

The content driver software service processes the content data using natural language processing technology that is implemented by one or more artificial intelligence software applications and systems. The artificial intelligence software and systems are in turn implemented using neural networks. Natural language processing technology analyzes one or more content data files that include alphanumeric textual data composed of individual communication elements, such as words, symbols or numbers. Natural language processing software techniques are implemented as unsupervised learning techniques that identify and characterize hidden structures of unlabeled content data, or supervised techniques that operate on labeled content data and include instructions informing the system which outputs are related to specific input values.

Supervised software processing can rely on iterative training techniques and training data to configure neural networks with an understanding of individual words, phrases, subjects, sentiments, and parts of speech. As an example, training data is utilized to train a neural network to recognize that phrases like "locked out," "change password," or "forgot login" all relate to the same general subject matter when the words are observed in proximity to one another at a significant frequency of occurrence.

Supervised learning software systems are trained using content data that is well-labeled or "tagged." During training, the supervised software systems learn the best mapping function between a known data input and expected known output (i.e., labeled or tagged content data). Supervised natural language processing software then uses the best approximating mapping learned during training to analyze unforeseen input data (never seen before) to accurately predict the corresponding output. Supervised learning software systems often require extensive and iterative optimization cycles to adjust the input-output mapping until they converge to an expected and well-accepted level of performance, such as an acceptable threshold error rate between a calculated probability and a desired threshold probability.

The software systems are supervised because the way of learning from training data mimics the same process of a teacher supervising the end-to-end learning process. Supervised learning software systems are typically capable of achieving excellent levels of performance but only when enough labeled data is available. Developing, scaling, deploying, and maintaining accurate supervised learning software systems can take significant time, resources, and technical expertise from a team of skilled data scientists.

Moreover, precision of the systems is dependent on the availability of labeled content data for training that is comparable to the corpus of content data that the system will process in a production environment.

Supervised learning software systems implement techniques that include, without limitation, Latent Semantic Analysis ("LSA"), Probabilistic Latent Semantic Analysis ("PLSA"), Latent Dirichlet Allocation ("LDA"), and more recent Bidirectional Encoder Representations from Transformers ("BERT"). Latent Semantic Analysis software processing techniques process a corporate of content data files to ascertain statistical co-occurrences of words that appear together which then give insights into the subjects of those words and documents.

Unsupervised learning software systems can perform training operations on unlabeled data and less requirement for time and expertise from trained data scientists. Unsupervised learning software systems can be designed with integrated intelligence and automation to automatically discover information, structure, and patterns from content data. Unsupervised learning software systems can be implemented with clustering software techniques that include, without limitation, K-mean clustering, Mean-Shift clustering, Density-based clustering, Spectral clustering, Principal Component Analysis, and Neural Topic Modeling ("NTM").

Clustering software techniques can automatically group semantically similar user utterances together to accelerate the derivation and verification of an underneath common user intent—i.e., ascertain or derive a new classification or subject, and not just classification into an existing subject or classification. Unsupervised learning software systems are also used for association rules mining to discover relationships between features from content data. At times, unsupervised learning software systems can be less accurate than well-trained supervised systems.

The content driver software service utilizes one or more supervised or unsupervised software processing techniques to perform a subject classification analysis to generate subject data. Suitable software processing techniques can include, without limitation, Latent Semantic Analysis, Probabilistic Latent Semantic Analysis, Latent Dirichlet Allocation. Latent Semantic Analysis software processing techniques generally process a corpus of alphanumeric text files, or documents, to ascertain statistical co-occurrences of words that appear together which then give insights into the subjects of those words and documents. The content driver software service can utilize software processing techniques that include Non-Matrix Factorization, Correlated Topic Model ("CTM"), and KMeans or other types of clustering.

The content data is first pre-processes using a reduction analysis to create reduced content data. The reduction analysis first performs a qualification operation that removes unqualified content data that does not meaningfully contribute to the subject classification analysis. The qualification operation removes certain content data according to criteria defined by a provider. For instance, the qualification analysis can determine whether content data files are "empty" and contain no recorded linguistic interaction between a provider agent and a user, and designate such empty files as not suitable for use in a subject classification analysis. As another example, the qualification analysis can designate files below a certain size or having a shared experience duration below a given threshold (e.g., less than one minute) as also being unsuitable for use in the subject classification analysis.

The reduction analysis can also perform a contradiction operation to remove contradictions and punctuations from the content data. Contradictions and punctuation include removing or replacing abbreviated words or phrases that can cause inaccuracies in a subject classification analysis. Examples include removing or replacing the abbreviations "min" for minute, "u" for you, and "wanna" for "want to," as well as apparent misspellings, such as "mssed" for the word missed. In some embodiments, the contradictions can be replaced according to a standard library of known abbreviations, such as replacing the acronym "brb" with the phrase "be right back." The contradiction operation can also remove or replace contractions, such as replacing "we're" with "we are."

The reduction analysis can also streamline the content data by performing one or more of the following operations, including: (i) tokenization to transform the content data into a collection of words or key phrases having punctuation and capitalization removed; (ii) stop word removal where short, common words or phrases such as "the" or "is" are removed; (iii) lemmatization where words are transformed into a base form, like changing third person words to first person and changing past tense words to present tense; (iv) stemming to reduce words to a root form, such as changing plural to singular; and (v) hyponymy and hypernym replacement where certain words are replaced with words having a similar meaning so as to reduce the variation of words within the content data.

Following a reduction analysis, the reduced content data is vectorized to map the alphanumeric text into a vector form. One approach to vectorising content data includes applying "bag-of-words" modeling. The bag-of-words approach counts the number of times a particular word appears in content data to convert the words into a numerical value. The bag-of-words model can include parameters, such as setting a threshold on the number of times a word must appear to be included in the vectors.

Techniques to encode the context of words, or communication elements, determine how often communication elements appear together. Determining the adjacent pairing of communication elements can be achieved by creating a co-occurrence matrix with the value of each member of the matrix counting how often one communication element coincides with another, either just before or just after it. That is, the words or communication elements form the row and column labels of a matrix, and a numeric value appears in matrix elements that correspond to a row and column label for communication elements that appear adjacent in the content data.

As an alternative to counting communication elements (i.e., words) in a corpus of content data and turning it into a co-occurrence matrix, another software processing technique is to use a communication element in the content data corpus to predict the next communication element. Looking through a corpus, counts are generated for adjacent communication elements, and the counts are converted from frequencies into probabilities (i.e., using n-gram predictions with Kneser-Nay smoothing) using a simple neural network. Suitable neural network architectures for such purpose include a skip-gram architecture. The neural network is trained by feeding through a large corpus of content data, and embedded middle layers in the neural network are adjusted to best predict the next word.

The predictive processing creates weight matrices that densely carry contextual, and hence semantic, information from the selected corpus of content data. Pre-trained, contextualized content data embedding can have high dimensionality. To reduce the dimensionality, a Uniform Manifold Approximation and Projection algorithm ("UMAP") can be applied to reduce dimensionality while maintaining essential information.

Prior to conducting a subject analysis to ascertain subjects identifiers in the content data (i.e., topics or subjects addressed in the content data) or interaction driver identifiers in the content data (i.e., reasons why the customer initiated the interaction with the provider, such as the reason underlying a support request), the system can perform a concentration analysis on the content data. The concentration analysis concentrates, or increases the density of, the content data by identifying and retaining communication elements having significant weight in the subject analysis and discarding or ignoring communication elements having relativity little weight.

In one embodiment, the concentration analysis includes executing a frequency—inverse document frequency ("tf-idf") software processing technique to determine the frequency or corresponding weight quantifier for communication elements with the content data. The weight quantifiers are compared against a pre-determined weight threshold to generate concentrated content data that is made up of communication elements having weight quantifiers above the weight threshold.

The concentrated content data is processed using a subject classification analysis to determine subject identifiers (i.e., topics) addressed within the content data. The subject classification analysis can specifically identify one or more interaction driver identifiers that are the reason why a user initiated a shared experience or support service request. An interaction driver identifier can be determined by, for example, first determining the subject identifiers having the highest weight quantifiers (e.g., frequencies or probabilities) and comparing such subject identifiers against a database of known interaction driver identifiers. To illustrate, the subject identifiers from a shared experience having the five (5) highest frequencies or probabilities might include "forgot password," "report fraud," "the weather," "children," and "covid-19." The provider system compares the top five subject identifiers against a list of known interaction driver identifiers that includes "forgot password" and "report fraud" as a known support driver but not "weather," "children," and "covid-19." In that instance, the provider system identifiers the two support drivers as being "forgot password" and "report fraud."

In one embodiment, the subject classification analysis is performed on the content data using a Latent Drichlet Allocation analysis to identify subject data that includes one or more subject identifiers (e.g., topics addressed in the underlying content data). Performing the LDA analysis on the reduced content data may include transforming the content data into an array of text data representing key words or phrases that represent a subject (e.g., a bag-of-words array) and determining the one or more subjects through analysis of the array. Each cell in the array can represent the probability that given text data relates to a subject. A subject is then represented by a specified number of words or phrases having the highest probabilities (i.e., the words with the five highest probabilities), or the subject is represented by text data having probabilities above a predetermined subject probability threshold.

Clustering software processing techniques include K-means clustering, which is an unsupervised processing technique that does not utilized labeled content data. Clusters are defined by "K" number of centroids where each centroid is a point that represents the center of a cluster. The K-means processing technique run in an iterative fashion where each centroid is initially placed randomly in the vector space of the dataset, and the centroid moves to the center of the points that is closest to the centroid. In each new iteration, the distance between each centroid and the points are recalculated, and the centroid moves again to the center of the closest points. The processing completes when the position or the groups no longer change or when the distance in which the centroids change does not surpass a pre-defined threshold.

The clustering analysis yields a group of words or communication elements associated with each cluster, which can be referred to as subject vectors. Subjects may each include one or more subject vectors where each subject vector includes one or more identified communication elements (i.e., keywords, phrases, symbols, etc.) within the content data as well as a frequency of the one or more communication elements within the content data. The content driver software service can be configured to perform an additional concentration analysis following the clustering analysis that selects a pre-defined number of communication elements from each cluster to generate a descriptor set, such as the five or ten words having the highest weights in terms of frequency of appearance (or in terms of the probability that the words or phrases represent the true subject when neural networking architecture is used). In one embodiment, the descriptor sets were analyzed to determine if the reasons driving a customer support request were identified by the descriptor set subject identifiers.

The software model was evaluated according to three categories, including a "good match" where the support request reason(s) were identified by the top words in the subject vector (i.e., the words with the highest weight or frequency), a "moderate" match where the support request reason(s) were identified by the second tier of words in the subject vector (i.e., words six to ten), and a "poor" match where, for instance, the top words in a subject vector did not match or identify the reasons the support request was initiated.

Research to evaluate the model showed that for 70% of the clusters, the support request drivers or subject identifiers were properly identified by the top words within a subject vector set of words (i.e., a good match), and for 13% of the clusters, the support request drivers were identified as a moderate match to words within the subject vectors. This was taken to be an approximately 83% accuracy in identifying the reasons underlying a support request. The accuracy represents an improvement of about 7% in the accuracy that can be achieved through manual identification of support request drivers, as reported by agents following a shared experience such as a support request.

Alternatively, instead of selecting a pre-determined number of communication elements, post-clustering concentration analysis can analyze the subject vectors to identify communication elements that are included in a number of subject vectors having a weight quantifier (e.g., a frequency) below a specified weight threshold level that are then removed from the subject vectors. In this manner, the subject vectors are refined to exclude content data less likely to be related to a given subject. To reduce an effect of spam, the subject vectors may be analyzed, such that if one subject vector is determined to include communication elements that are rarely used in other subject vectors, then the communication elements are marked as having a poor subject correlation and is removed from the subject vector.

In another embodiment, the concentration analysis is performed on unclassified content data by mapping the communication elements within the content data to integer values. The content data is, thus, turned into a bag-of-words that includes integer values and the number of times the integers occur in content data. The bag-of-words is turned into a unit vector, where all the occurrences are normalized to the overall length. The unit vector may be compared to other subject vectors produced from an analysis of content data by taking the dot product of the two unit vectors. All the dot products for all vectors in a given subject are added together to provide a weighting quantifier or score for the given subject identifier, which is taken as subject weighting data. A similar analysis can be performed on vectors created through other processing, such as Kmeans clustering or techniques that generate vectors where each word in the vector is replaced with a probability that the word represents a subject identifier or request driver data.

To illustrate generating subject weighting data, for any given subject there may be numerous subject vectors. Assume that for most of subject vectors, the dot product will be close to zero—even if the given content data addresses the subject at issue. Since there are some subjects with numerous subject vectors, there may be numerous small dot products that are added together to provide a significant score. Put another way, the particular subject is addressed consistently throughout a document, several documents, sessions of the content data, and the recurrence of the carries significant weight.

In another embodiment, a predetermined threshold may be applied where any dot product that has a value less than the threshold is ignored and only stronger dot products above the threshold are summed for the score. In another embodiment, this threshold may be empirically verified against a training data set to provide a more accurate subject analyses.

In another example, a number of subject identifiers may be substantially different, with some subjects having orders of magnitude fewer subject vectors than others. The weight scoring might significantly favor relatively unimportant subjects that occur frequently in the content data. To address this problem, a linear scaling on the dot product scoring based on the number of subject vectors may be applied. The result provides a correction to the score so that important but less common subjects are weighed more heavily.

Once all scores are calculated for all subjects, then subjects may be sorted, and the most probable subjects are returned. The resulting output provides an array of subjects and strengths. In another embodiment, hashes may be used to store the subject vectors to provide a simple lookup of text data (e.g., words and phrases) and strengths. The one or more subject vectors can be represented by hashes of words and strengths, or alternatively an ordered byte stream (e.g., an ordered byte stream of 4-byte integers, etc.) with another array of strengths (e.g., 4-byte floating-point strengths, etc.).

The content driver software service can also use term frequency—inverse document frequency software processing techniques to vectorize the content data and generating weighting data that weight words or particular subjects. The tf-idf is represented by a statistical value that increases proportionally to the number of times a word appears in the content data. This frequency is offset by the number of separate content data instances that contain the word, which adjusts for the fact that some words appear more frequently in general across multiple shared experiences or content data files. The result is a weight in favor of words or terms more likely to be important within the content data, which in turn can be used to weigh some subjects more heavily in importance than others. To illustrate with a simplified example, the tf-idf might indicate that the term "password" carries significant weight within content data. To the extent any of the subjects identified by a natural language processing analysis include the term "password," that subject can be assigned more weight by the content driver software service.

The content data can be visualized and subject to a reduction into two dimensional data using a Uniform Manifold Approximation and Projection algorithm ("UMAP") to generate a cluster graph visualizing a plurality of clusters. The content driver software service feeds the two dimensional data into a Density Based Spatial Clustering of Applications with Noise algorithm ("DBSCAN") and identify a center of each cluster of the plurality of clusters. The process may, using the two dimensional data from the UMAP and the center of each cluster from the DBSCAN, apply a K— Nearest neighbor algorithm ("KNN") to identify data points closest to the center of each cluster and shade each of the data points to graphically identify each cluster of the plurality of clusters. The processor may illustrate a graph on the display representative of the data points shaded following application of the KNN.

The content driver software service further analyzes the content data through, for example, semantic segmentation to identify attributes of the content data. Attributes include, for instance, parts of speech, such as the presence of particular interrogative words, such as who, whom, where, which, how, or what. In another example, the content data is analyzed to identify the location in a sentence of interrogative words and the surrounding context. For instance, sentences that start with the words "what" or "where" are more likely to be questions than sentence having these words placed in the middle of the sentence (e.g., "I don't know what to do," as opposed to "What should I do?" or "Where is the word?" as opposed to "Locate where in the sentence the word appears."). In that case, the closer the interrogative word is to the beginning of a sentence, the more weight is given to the probability it is a question word when applying neural networking techniques.

The content driver software service can also incorporate Part of Speech ("POS") tagging software code that assigns words a parts of speech depending upon the neighboring words, such as tagging words as a noun, pronoun, verb, adverb, adjective, conjunction, preposition, or other relevant parts of speech. The content driver software service can utilize the POS tagged words to help identify questions and subjects according to pre-defined rules, such as recognizing that the word "what" followed by a verb is also more likely to be a question than the word "what" followed by a preposition or pronoun (e.g., "What is this?" versus "What he wants is an answer.").

POS tagging in conjunction with Named Entity Recognition ("NER") software processing techniques can be used by the content driver software service to identify various content sources within the content data. NER techniques are utilized to classify a given word into a category, such as a person, product, organization, or location. Using POS and NER techniques to process the content data allow the content driver software service to identify particular words and text as a noun and as representing a person participating in the discussion (i.e., a content source).

The content driver software service can also perform a sentiment analysis to determine sentiment from the content data. Sentiment can indicate a view or attitude toward a situation or an event. Further, identifying sentiment in data can be used to determine a feeling, emotion or an opinion. The sentiment analysis can apply rule-based software applications or neural networking software applications, such as convolutional neural networks (discussed below), a lexical co-occurrence network, and bigram word vectors to perform sentiment analysis to improve accuracy of the sentiment analysis.

Polarity-type sentiment analysis (i.e., a polarity analysis) can apply a rule-based software approach that relies on lexicons, or lists of positive and negative words and phrases that are assigned a polarity score. For instance, words such as "fast," "great," or "easy" are assigned a polarity score of certain value while other words and phrases such as "failed," "lost," or "rude" are assigned a negative polarity score. The polarity scores for each word within the tokenized, reduced hosted content data are aggregated to determine an overall polarity score and a polarity identifier. The polarity identifier can correlate to a polarity score or polarity score range according to settings predetermined by an enterprise. For instance, a polarity score of +5 to +9 may correlate to a polarity identifier of "positive," and a polarity score of +10 or higher correlates to a polarity identifier of "very positive."

To illustrate a polarity analysis with a simplified example, the words "great" and "fast" might be assigned a positive score of five (+5) while the word "failed" is assigned a score of negative ten (−10) and the word "lost" is assigned a score of negative five (−5). The sentence "The agent failed to act fast" could then be scored as a negative five (−5) reflecting an overall negative polarity score that correlatives to a "somewhat negative" polarity indicator. Similarly, the sentence "I lost my debit card, but the agent was great and got me a new card fast" might be scored as a positive five (+5), thereby reflecting a positive sentiment with a positive polarity score and polarity identifier.

The content driver software service can also apply machine learning software to determine sentiment, including use of such techniques to determine both polarity and emotional sentiment. Machine learning techniques also start with a reduction analysis. Words are then transformed into numeric values using vectorization that is accomplished through a bag-of-words model, Word2Vec techniques, or other techniques known to those of skill in the art. Word2Vec, for example, can receive a text input (e.g., a text corpus from a large data source) and generate a data structure (e.g., a vector representation) of each input word as a set of words.

Each word in the set of words is associated with a plurality of attributes. The attributes can also be called features, vectors, components, and feature vectors. For example, the data structure may include features associated with each word in the set of words. Features can include, for example, gender, nationality, etc. that describe the words. Each of the features may be determined based on techniques for machine learning (e.g., supervised machine learning) trained based on association with sentiment.

Training the neural networks is particularly important for sentiment analysis to ensure parts of speech such as subjectivity, industry specific terms, context, idiomatic language, or negation are appropriately processed. For instance, the phrase "Our rates are lower than competitors" could be a favorable or unfavorable comparison depending on the particular context, which should be refined through neural network training.

Machine learning techniques for sentiment analysis can utilize classification neural networking techniques where a corpus of content data is, for example, classified according to polarity (e.g., positive, neural, or negative) or classified according to emotion (e.g., satisfied, contentious, etc.). Suitable neural networks can include, without limitation, Naive Bayes, Support Vector Machines using Logistic Regression, convolutional neural networks, a lexical co-occurrence network, bigram word vectors, Long Short-Term Memory.

Neural networks are trained using training set content data that comprise sample tokens, phrases, sentences, paragraphs, or documents for which desired subjects, content sources, interrogatories, or sentiment values are known. A labeling analysis is performed on the training set content data to annotate the data with known subject labels, interrogatory labels, content source labels, or sentiment labels, thereby generating annotated training set content data. For example, a person can utilize a labeling software application to review training set content data to identify and tag or "annotate" various parts of speech, subjects, interrogatories, content sources, and sentiments.

The training set content data is then fed to the content driver software service neural networks to identify subjects, content sources, or sentiments and the corresponding probabilities. For example, the analysis might identify that particular text represents a question with a 35% probability. If the annotations indicate the text is, in fact, a question, an error rate can be taken to be 65% or the difference between the calculated probability and the known certainty. Then parameters to the neural network are adjusted (i.e., constants and formulas that implement the nodes and connections between node), to increase the probability from 35% to ensure the neural network produces more accurate results, thereby reducing the error rate. The process is run iteratively on different sets of training set content data to continue to increase the accuracy of the neural network.

For some embodiments, the content driver software service can be configured to determine relationships between and among subject identifiers and sentiment identifiers. Determining relationships among identifiers can be accomplished through techniques, such as determining how often two identifier terms appear within a certain number of words of each other in a set of content data packets. The higher the frequency of such appearances, the more closely the identifiers would be said to be related.

A useful metric for degree of relatedness that relies on the vectors in the data set as opposed to the words is cosine similarity. Cosine similarity is a technique for measuring the degree of separation between any two vectors, by measuring the cosine of the vectors' angle of separation. If the vectors are pointing in exactly the same direction, the angle between them is zero, and the cosine of that angle will be one (1), whereas if they are pointing in opposite directions, the angle between them is "pi" radians, and the cosine of that angle will be negative one (−1). If the angle is greater than pi radians, the cosine is the same as it is for the opposite angle; thus, the cosine of the angle between the vectors varies inversely with the minimum angle between the vectors, and the larger the cosine is, the closer the vectors are to pointing in the same direction.

Artificial Intelligence

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor ("KNN"), and the like. Additionally or alternatively, the machine learning algorithm may include one or more regression algorithms configured to output a numerical value in response to a given input. Further, the machine learning may include one or more pattern recognition algorithms— e.g., a module, subroutine or the like capable of translating text or string characters and/or a speech recognition module or subroutine. The machine learning modules may include a machine learning acceleration logic (e.g., a fixed function matrix multiplication logic) that implements the stored processes or optimizes the machine learning logic training and interface.

Machine learning models are trained using various data inputs and techniques. Example training methods may include, for example, supervised learning, (e.g., decision tree learning, support vector machines, similarity and metric learning, etc.), unsupervised learning, (e.g., association rule learning, clustering, etc.), reinforcement learning, semi-supervised learning, self-supervised learning, multi-instance learning, inductive learning, deductive inference, transductive learning, sparse dictionary learning and the like. Example clustering algorithms used in unsupervised learning may include, for example, k-means clustering, density based special clustering of applications with noise (e.g., DBSCAN), mean shift clustering, expectation maximization (e.g., EM) clustering using Gaussian mixture models (e.g., GMM), agglomerative hierarchical clustering, or the like. In one embodiment, clustering of data may be performed using a cluster model to group data points based on certain similarities using unlabeled data. Example cluster models may include, for example, connectivity models, centroid models, distribution models, density models, group models, graph based models, neural models and the like.

One subfield of machine learning includes neural networks, which take inspiration from biological neural networks. In machine learning, a neural network includes interconnected units that process information by responding to external inputs to find connections and derive meaning from undefined data. A neural network can, in a sense, learn to perform tasks by interpreting numerical patterns that take the shape of vectors and by categorizing data based on similarities, without being programmed with any task-specific rules. A neural network generally includes connected units, neurons, or nodes (e.g., connected by synapses) and may allow for the machine learning program to improve performance. A neural network may define a network of functions, which have a graphical relationship. Various neural networks that implement machine learning exist including, for example, feedforward artificial neural networks, perceptron and multilayer perceptron neural networks, radial basis function artificial neural networks, recurrent artificial neural networks, modular neural networks, long short term memory networks, as well as various other neural networks.

Figure 2A:
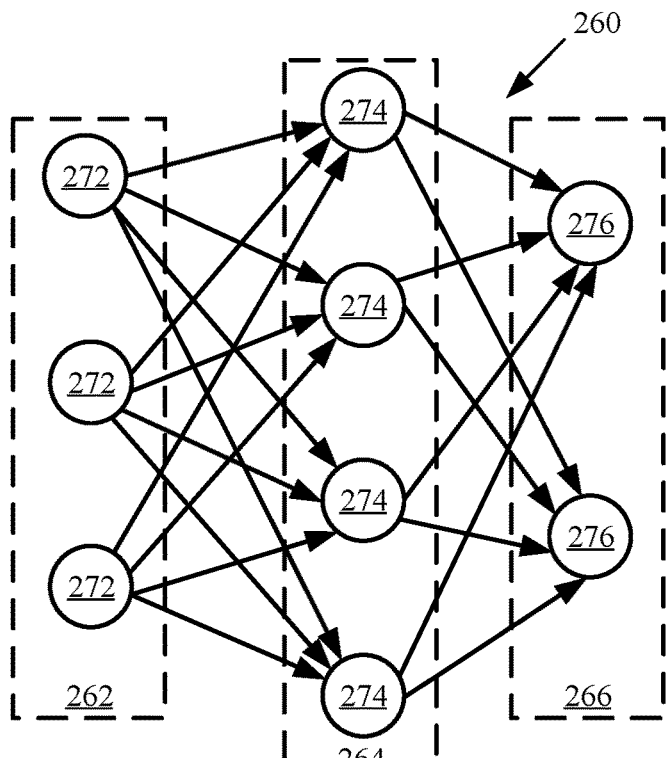
FIG. 2A is a diagram of a feedforward network, according to at least one embodiment, utilized in machine learning.

A feedforward network 260 (as depicted in FIG. 2A) may include a topography with a hidden layer 264 between an input layer 262 and an output layer 266. The input layer 262 includes input nodes 272 that communicate input data, variables, matrices, or the like to the hidden layer 264 that is implemented with hidden layer nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge.

In at least one embodiment of such a feedforward network, data is communicated to the nodes 272 of the input layer, which then communicates the data to the hidden layer 264. The hidden layer 264 may be configured to determine the state of the nodes in the respective layers and assign weight coefficients or parameters of the nodes based on the edges separating each of the layers. That is, the hidden layer 264 implements activation functions between the input data communicated from the input layer 262 and the output data communicated to the nodes 276 of the output layer 266.

It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem.

Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient (e.g., a propagated value). The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network ("CNN"). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program.

A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

Figure 2C:
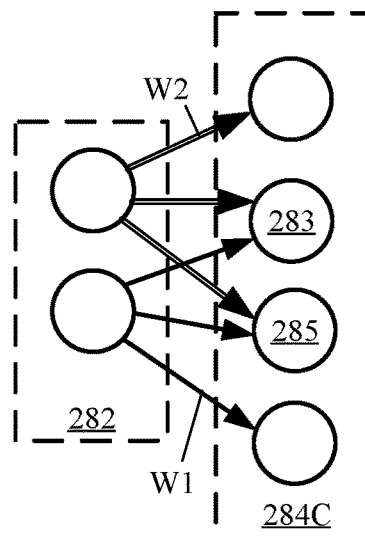
FIG. 2C is a diagram of a portion of the convolution neural network of FIG. 2B, according to at least one embodiment, illustrating assigned weights at connections or neurons.
Figure 2B:
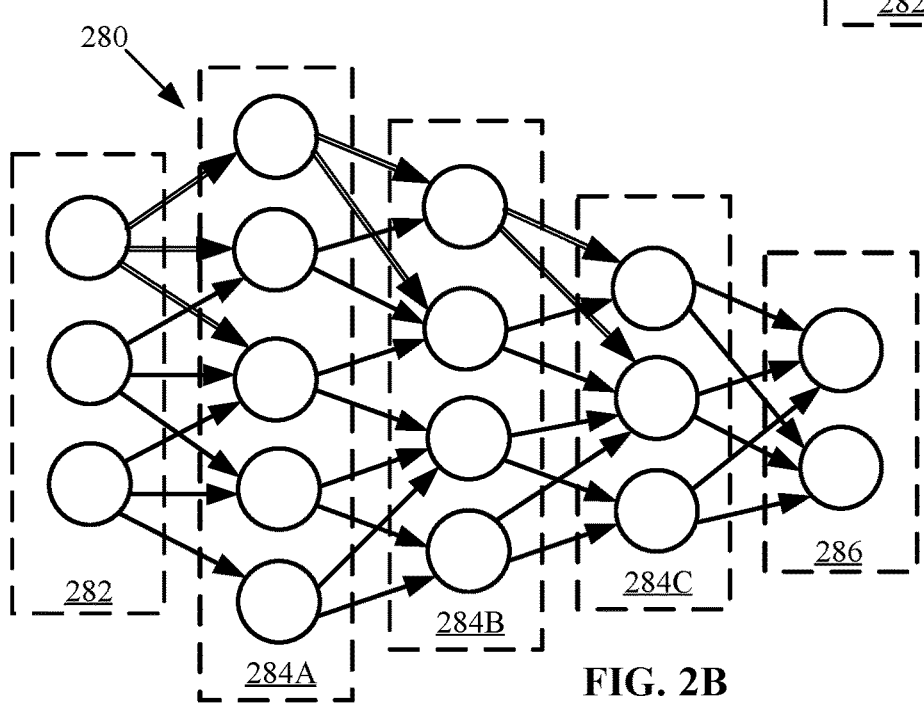
FIG. 2B is a diagram of a convolution neural network, according to at least one embodiment, utilized in machine learning.

An example convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Figure 3:
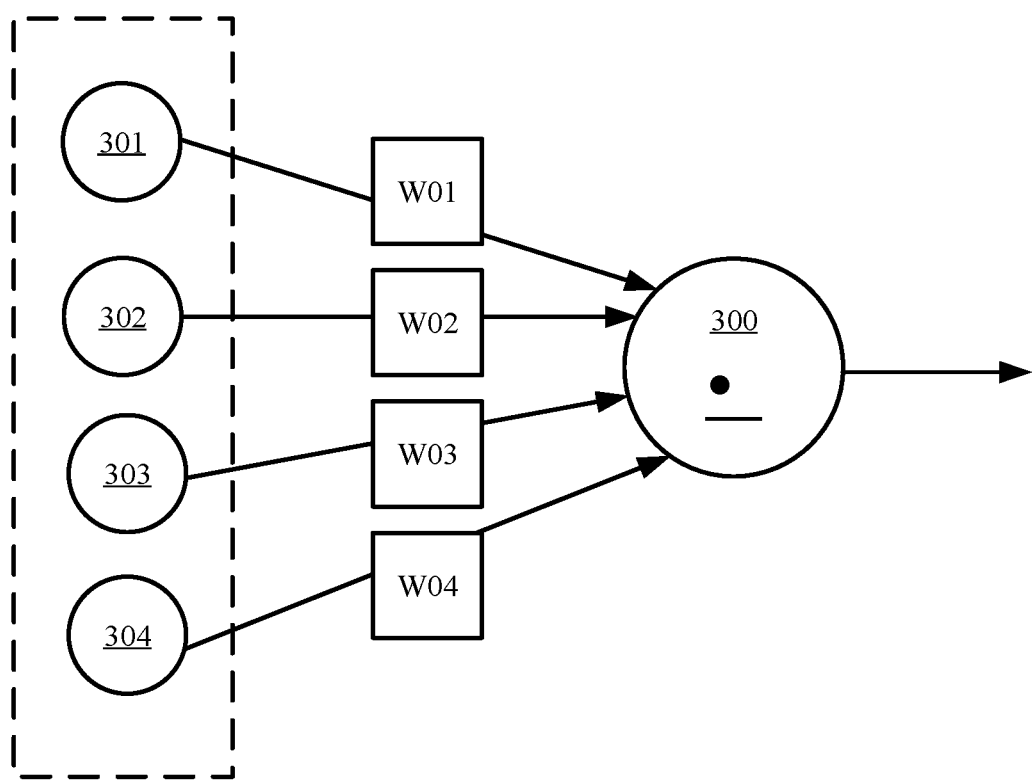
FIG. 3 is a diagram representing an example weighted sum computation in a node in an artificial neural network.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network ("RNN"). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter. That is, at least a portion of the output data from the RNN may be used as feedback or input in calculating subsequent output data. In some embodiments, the machine learning module may include an RNN configured for language processing (e.g., an RNN configured to perform statistical language modeling to predict the next word in a string based on the previous words). The RNN(s) of the machine learning program may include a feedback system suitable to provide the connection(s) between subsequent and previous layers of the network.

Figure 4:
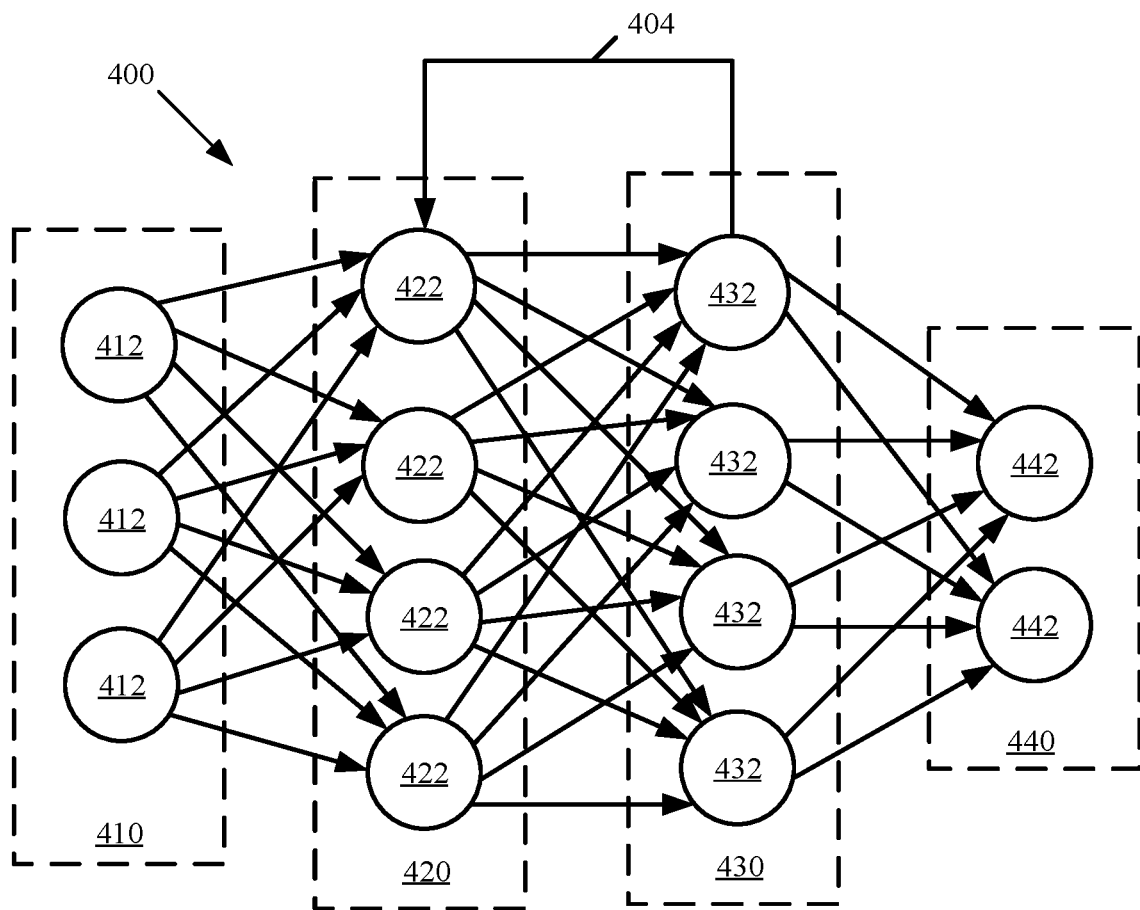
FIG. 4 is a diagram of a Recurrent Neural Network RNN, according to at least one embodiment, utilized in machine learning.

An example RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more nodes of a subsequent layer may provide or communicate a parameter or other data to a previous layer of the RNN network 400. Moreover, in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them (i.e., nodes of nonsequential layers of the RNN 400).

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks (e.g., by providing a known input vector, including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers).

Generally, the neural network(s) of the machine learning program may include a relatively large number of layers (e.g., three or more layers) and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

According to various implementations, deep neural networks incorporate neurons, synapses, weights, biases, and functions and can be trained to model complex non-linear relationships. Various deep learning frameworks may include, for example, TensorFlow, MxNet, PyTorch, Keras, Gluon, and the like. Training a deep neural network may include complex input output transformations and may include, according to various embodiments, a backpropagation algorithm. According to various embodiments, deep neural networks may be configured to classify images of handwritten digits from a dataset or various other images. According to various embodiments, the datasets may include a collection of files that are unstructured and lack predefined data model schema or organization. Unlike structured data, which is usually stored in a relational database (RDBMS) and can be mapped into designated fields, unstructured data comes in many formats that can be challenging to process and analyze. Examples of unstructured data may include, according to non-limiting examples, dates, numbers, facts, emails, text files, scientific data, satellite imagery, media files, social media data, text messages, mobile communication data, and the like.

Figure 5:
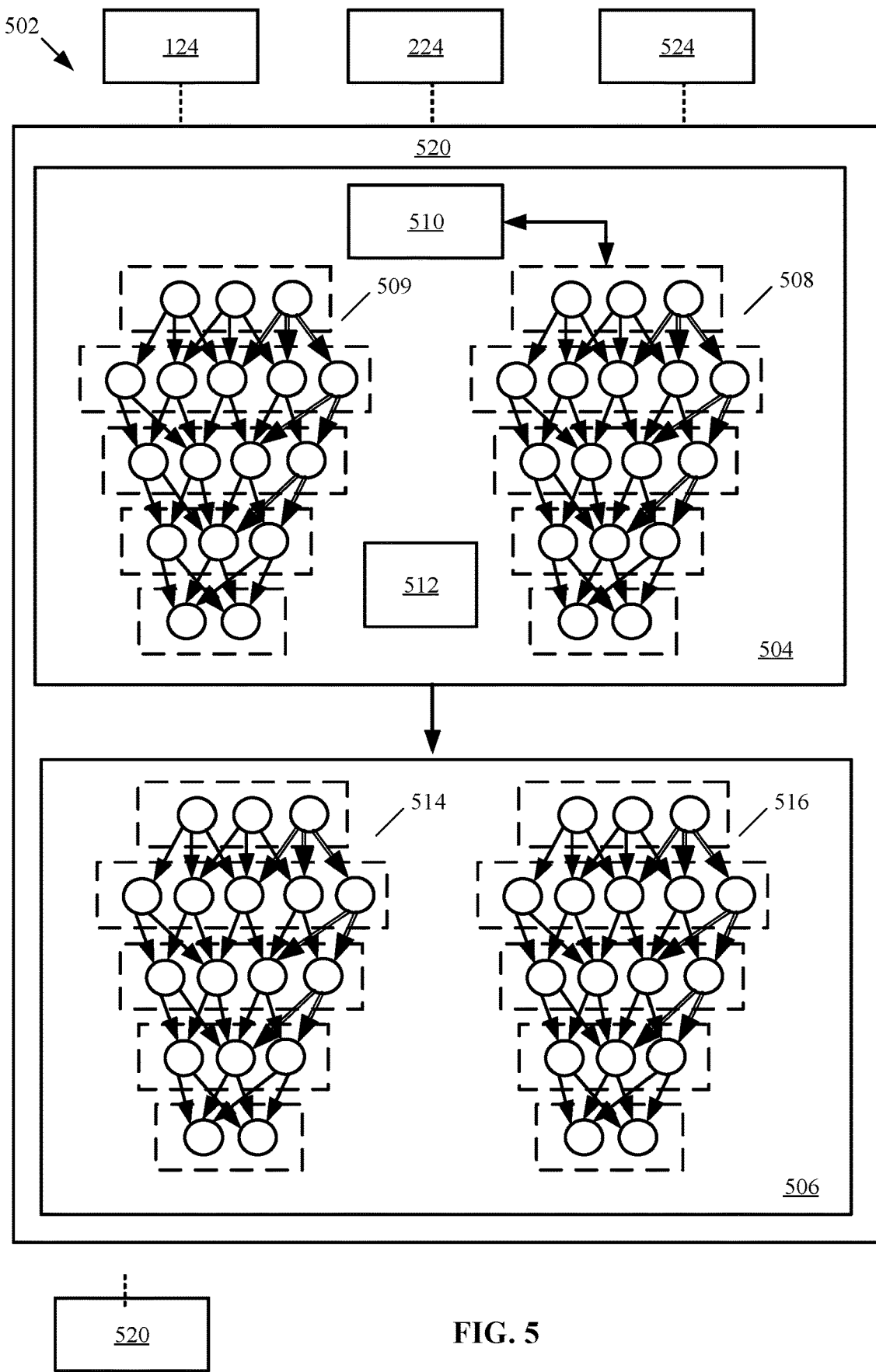
FIG. 5 is a schematic logic diagram of an artificial intelligence program including a front-end and a back-end algorithm.

Referring now to FIG. 5 and some embodiments, an artificial intelligence program 502 may include a front-end algorithm 504 and a back-end algorithm 506. The artificial intelligence program 502 may be implemented on an AI processor 520. The instructions associated with the front-end algorithm 504 and the back-end algorithm 506 may be stored in an associated memory device and/or storage device of the system (e.g., storage device 124, memory device 122, storage device 124, and/or memory device 222) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation, such as natural language processing). For example, a CNN 508 and/or AI algorithm 510 may be used for image recognition, input categorization, and/or support vector training.

In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data (e.g., without known output data with which to compare). During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known (e.g., a mix of labeled and unlabeled data having the same distribution).

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory ("LSTM") RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression ("LR"), Naive-Bayes, Random Forest ("RF"), matrix factorization, and support vector machines) in addition to, or as an alternative to, one or more neural networks, as described herein.

Those of skill in the art will also appreciate that other types of neural networks may be used to implement the systems and methods disclosed herein, including, without limitation, radial basis networks, deep feed forward networks, gated recurrent unit networks, auto encoder networks, variational auto encoder networks, Markov chain networks, Hopefield Networks, Boltzman machine networks, deep belief networks, deep convolutional networks, deconvolutional networks, deep convolutional inverse graphics networks, generative adversarial networks, liquid state machines, extreme learning machines, echo state networks, deep residual networks, Kohonen networks, and neural turning machine networks, as well as other types of neural networks known to those of skill in the art.

To implement natural language processing technology, suitable neural network architectures can include, without limitation: (i) multilayer perceptron ("MLP") networks having three or more layers and that utilizes a nonlinear activation function (mainly hyperbolic tangent or logistic function) that allows the network to classify data that is not linearly separable; (ii) convolutional neural networks; (iii) recursive neural networks; (iv) recurrent neural networks; (v) Long Short-Term Memory ("LSTM") network architecture; (vi) Bidirectional Long Short-Term Memory network architecture, which is an improvement upon LSTM by analyzing word, or communication element, sequences in forward and backward directions; (vii) Sequence-to-Sequence networks; and (viii) shallow neural networks such as word2vec (i.e., a group of shallow two-layer models used for producing word embedding that takes a large corpus of alphanumeric content data as input to produces a vector space where every word or communication element in the content data corpus obtains the corresponding vector in the space).

With respect to clustering software processing techniques that implement unsupervised learning, suitable neural network architectures can include, but are not limited to: (i) Hopefield Networks; (ii) a Boltzmann Machines; (iii) a Sigmoid Belief Net; (iv) Deep Belief Networks; (v) a Helmholtz Machine; (vi) a Kohonen Network where each neuron of an output layer holds a vector with a dimensionality equal to the number of neurons in the input layer, and in turn, the number of neurons in the input layer is equal to the dimensionality of data points given to the network; (vii) a Self-Organizing Map ("SOM") having a set of neurons connected to form a topological grid (usually rectangular) that, when presented with a pattern, the neuron with closest weight vector is considered to be the output with the neuron's weight adapted to the pattern, as well as the weights of neighboring neurons, to naturally find data clusters; and (viii) a Centroid Neural Network that is premised on Kmeans clustering software processing techniques.

Figure 6:
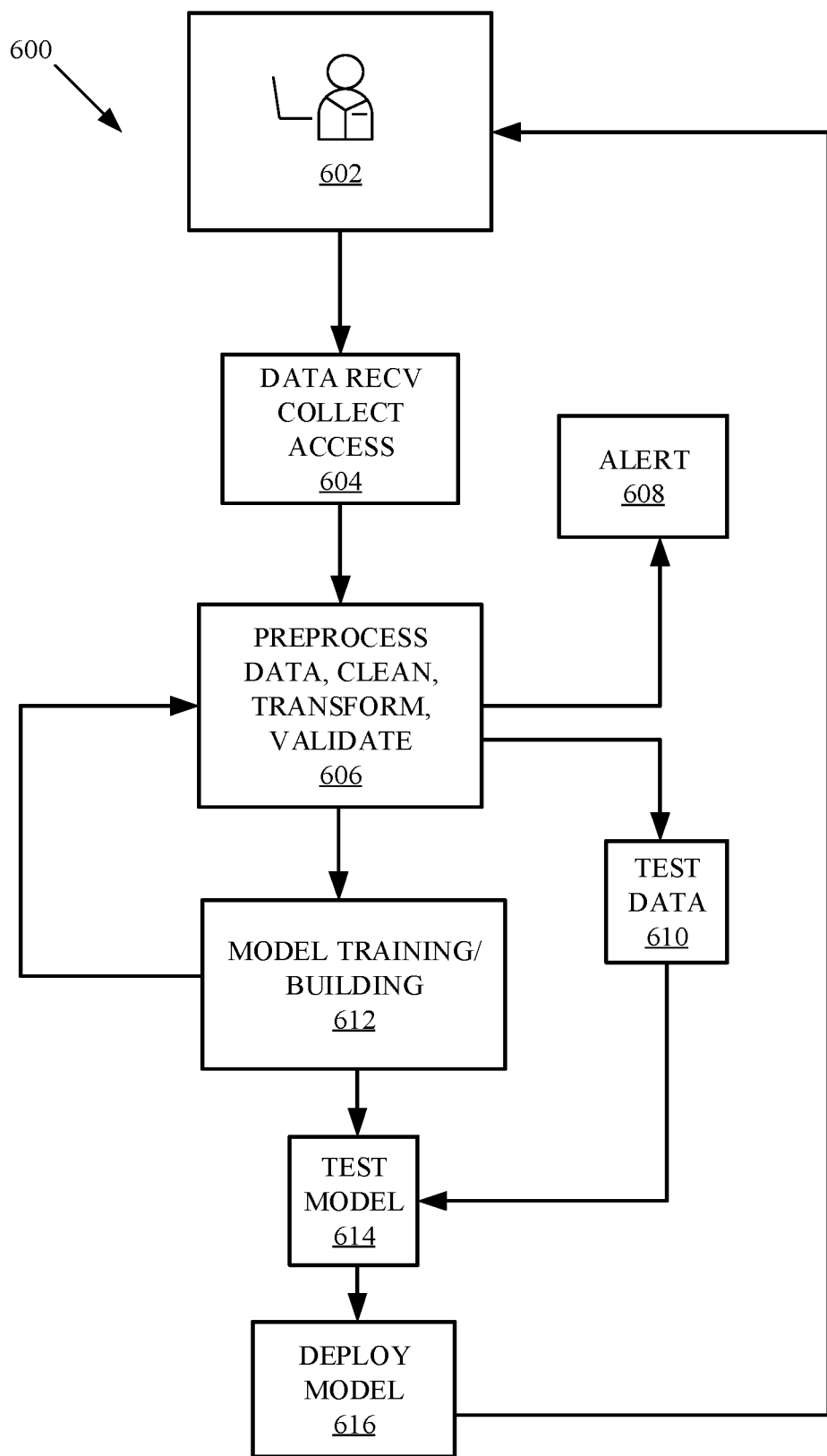
FIG. 6 is a flow chart representing a method model development and deployment by machine learning.

Turning to FIG. 6, a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, user evaluation data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, a new model will be generated. If the preprocessing step 606 is updated with newly ingested data, an updated model will be generated.

Step 606 can include data validation to confirm that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

Content Data Processing and Examples

Figure 7:
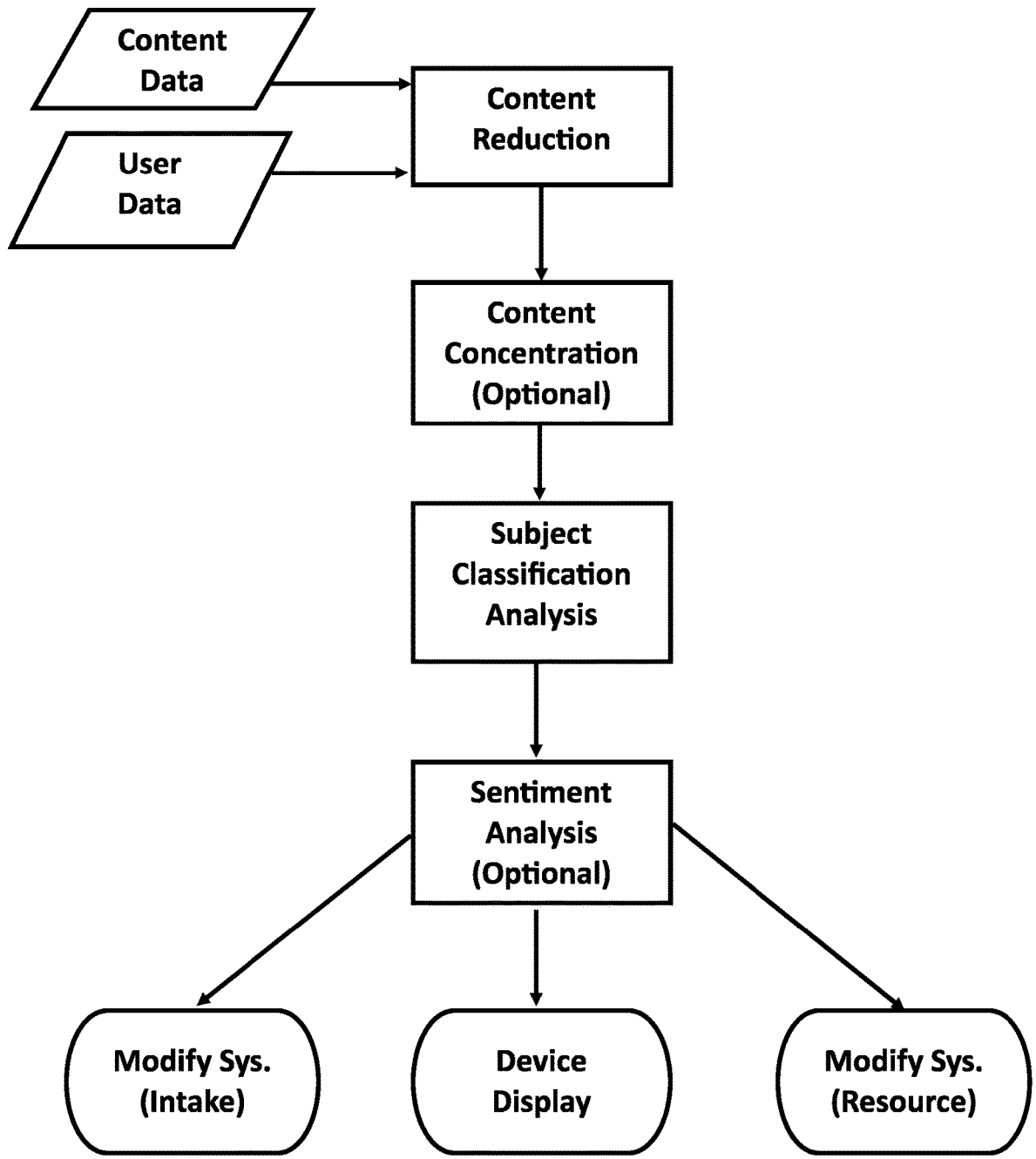
FIG. 7 is a flow chart representing a method for content analysis according to one embodiment.
Figure 10:
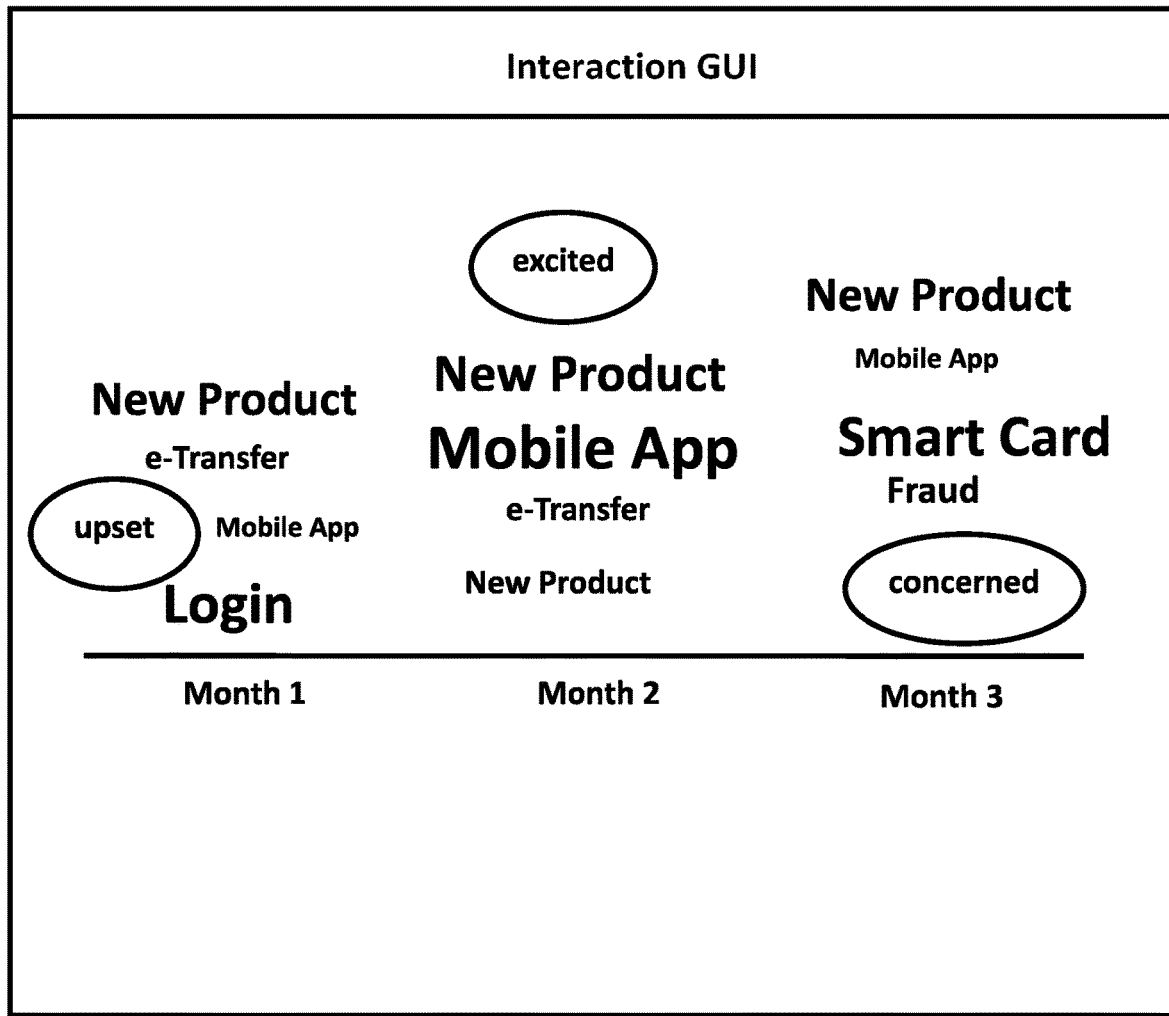
FIG. 10 is a third example of an Interaction Graphical User Interface according to one embodiment that displays aspects of analyzed content data.
Figure 11:
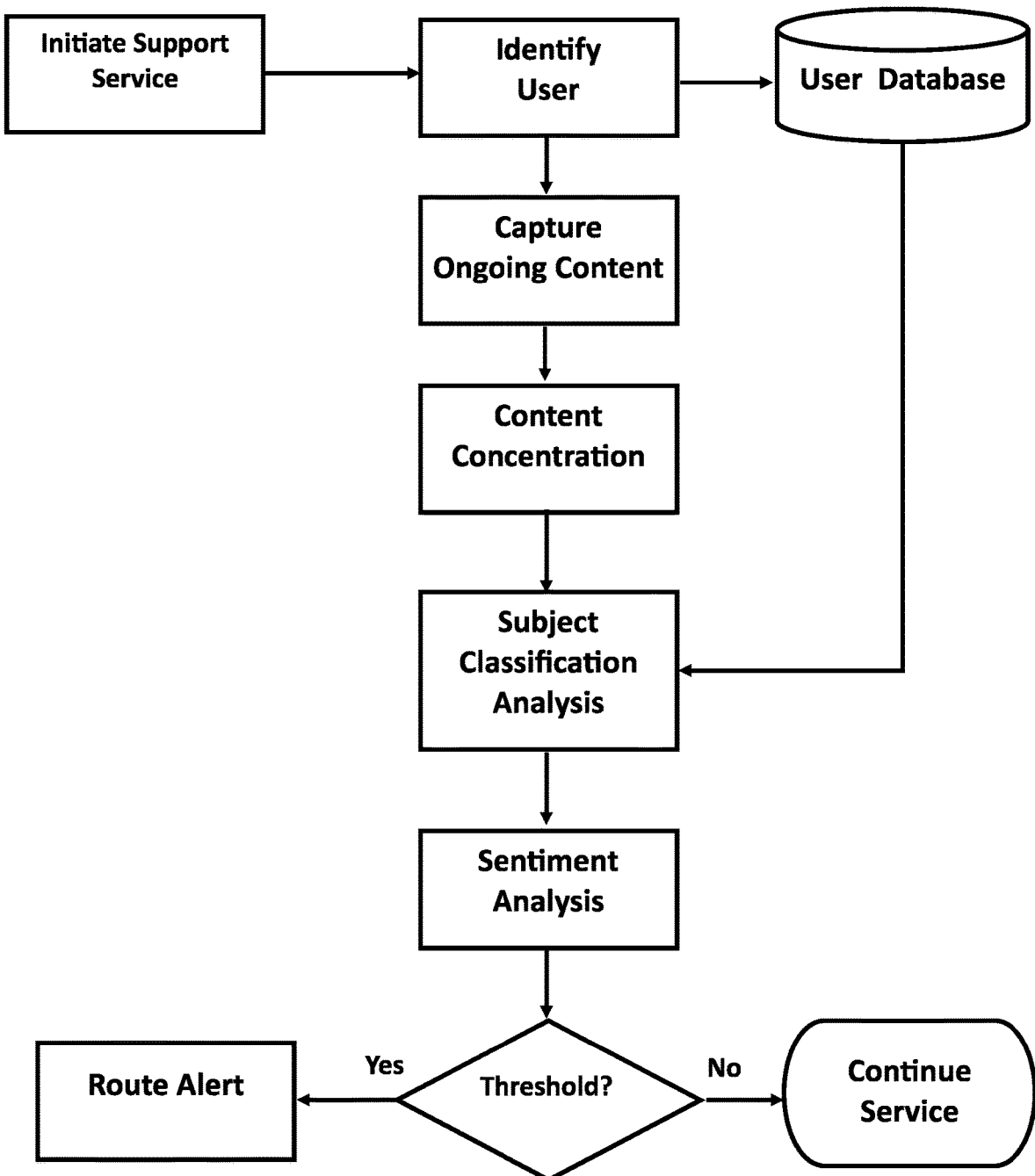
FIG. 11 is a flow chart representing a method for content analysis according to a second embodiment.

Example processes for analyzing content data are shown in FIGS. 7 and 11. The outputs of the process are displayed on a graphical user interface, such as the example Interaction GUIs shown in FIGS. 8 through 10. The system can process large volumes of content data that are aggregated, reduced, and segmented according to provider determined categories, such as filtering the content data according to subject or interaction driver. The content data is also parsed according to time periods and reduced for display on the Interaction GUI. The content data is reduced in that the content data is depicted using one or more subjects or sentiments that summarize the content data over time.

The provider system processes content data that can be a transcription of a discussion between a user and a provider or an exchange of written communications. The content data is stored to a database on the provider system or to a remote storage location. The content data is stored as content data files that include the substance of an exchange of communications along with content metadata. The content data files are processed with a reduction analysis that includes a qualification operation, contradiction operation, tokenization, stop word removal, stemming, hyponymy, and lemmatization, among other software processing techniques. The provider system optionally processes the content data files with a concentration analysis to yield concentrated content data.

The concentration analysis improves the efficiency and accuracy of a subsequent subject classification analysis, sentiment analysis, polarity analysis, or routing analyses by filtering out and excluding communication elements (e.g., words, phrases, symbols, or numerical values) that do not appreciably contribute to the subjects, interaction drivers, sentiment identifiers, or polarity reflected in the content data. The concentration analysis helps to ensure that certain communication elements of limited or no relevance do not factor into the subject or sentiment analyses, thereby changing the results in a manner that leads to inaccuracies. The concentration analysis also enhanced, or densifies, the results that are obtained. To illustrate, a user can initiate a support request to report that the user intends to travel and to thus request that the provider authorize transactions outside of the user's normal geographic area. In that case, words relating to geographic locations or travel might appear frequently in the content data and represent, for instance, five percent (5%) of the communication elements in the content data. But after removing communication elements as a result of the concentration analysis, the frequency of words relating to location or travel might increase to eight percent (8%) of all communication elements in the content data. In this manner, the frequency, or relative importance, of certain communication elements is enhanced as lending support to the results of the subject classification, sentiment, polarity, and routing analyses.

The provider system then performs a subject classification analysis by processing the content data using NPL and artificial intelligence software processing techniques that are implemented using neural networks. The subject classification analysis determines one or more subject identifiers that reflect subjects or topics addressed in the content data. The subject identifiers can be interaction driver identifiers, which are the reasons why a user initiated a shared experience. Unlike conventional systems, the present system is capable of efficiently and accurately identifying multiple subject or interaction driver identifiers.

Conventional systems rely on provider personnel to manually identify subjects or interaction drivers by, for example, selecting an option from among a pre-determined list of identifiers displayed on a pull-down menu or displayed proximal to a corresponding radio button input function. The provider make such a selection following a provider-user interaction or after reviewing content data generated from an interaction. The pre-determined list is by definition limited in the number of options that can be presented to a user. The list might not be able to provide options that reflect new or recent interaction drivers that do not commonly occur, or the options provide might not precisely and accurately characterize the interaction drivers or subjects.

To illustrate drawbacks of conventional systems, a provider may observe interaction drivers such as "chip debit card failure" that have not previously been common but that started recently after a provider received a defective shipment of chip cards. In that case, the pre-determined list of interaction driver identifiers might not contain any options indicating "chip debit card failure." Or the predetermined list might include only general options stating "device failure" that do not give the provider insights into the precise nature of the problems experienced by users. The selection of interaction drivers might also depend on a subjective interpretation of provider personnel in selecting between two potentially applicable interaction drivers, such as "payment problem" or "device failure."

By contrast, the systems of the present invention rely on sophisticated artificial intelligence and NPL technology that can precisely define a subject or sentiment identifier. Rather than merely reporting a "device failure," the system will identify key terms that allow issues to be more accurately defined with regard to the type of device and type of activity that are at the heart of an issue experienced by end users. The system can also identify multiple subjects, interaction drivers, or sentiments and is not limited to a single option as in conventional systems. Further, the current system is able to identify a trend where, for instance, users begin reporting payment failures as a result of the customer's chip card malfunctioning. The subject analysis will expediently detect newly appearing words or phrases in the content data, such as "card" or "debit card." This in turn allows the provider to focus an investigation into discovering and remediating a problem or implementing system enhancements.

Moreover, the system captures and analyzes information automatically and does not depend on provider agents or other personnel to take the time to select an input option. The automated process saves approximately 7.5 seconds per conventional call wrap up on every call. The time savings observed by the present Applicant were significant where the Applicant received over a million support requests in a single month.

The subject classification analysis can be implemented by neural networks that execute unsupervised learning software processing techniques that do not require substantial volumes of known and labeled training data. Suitable processing techniques include a clustering analyses, such as a Kmeans analysis. Those of skill in the art will appreciate, however, that supervised learning software processing techniques can also be applied, such as Latent Semantic Analysis software processing techniques, where training data is available.

In addition to content data, the subject classification analysis can process end user data, content metadata, system configuration data, navigation data, and other useful data and information. To illustrate with a few simplified examples, the end user data might indicate that user has recently purchased a new product or service or the system configuration data might indicate that the user obtained a new mobile computing device. In those cases, the neural network parameter values might increase in significance for neural network nodes contributing to subject identifier outcomes of "new product assistance" or "technical support with mobile application." As another example, the user navigation data might indicate that the user was performing key word searches in an Internet browser or mobile application for "residential interest rates". There again, neural network parameter values might be increased in significance for nodes contributing to a subject identifier of "home loan refinance" in response to the navigation data that reflects the user's online activity in researching residential loan interest rates.

The provider system optionally performs a sentiment analysis and/or a polarity analysis using the content data (or concentrated content data) to determine descriptors of sentiment and the polarity of the sentiment as being positive or negative as well as the degree of positivity or negativity. The sentiment identifiers and polarity can be displayed as stand-alone data using, for example, the Interaction GUI of FIG. 9. In that case, the sentiment identifiers or polarity can be representative of aggregated values, such as the top five most common or most likely sentiments for all shared experiences that were analyzed over a given day, month, or other duration (e.g., between two user-selected dates).

In other embodiments, the sentiment identifiers and polarity data can be determined and displayed as corresponding to specific subject identifiers or interaction driver identifiers. For example, the sentiment polarity data can be displayed on an Interaction GUI proximal to the subject identifiers (or interaction driver identifiers) showing whether the sentiment is positive or negative, such as a "+" sign or a "−" sign. Or a subject identifier can be displayed as being color-coded according to a positive or negative sentiment, such as red for a negative sentiment and green for a positive sentiment. Alternative embodiments can instead display a quantitative measurement of sentiment, such as a sentiment polarity score proximal to specific subject identifiers or a qualitative description of sentiment, such as "optimistic," "frustrated," "contentious," or other applicable sentiment descriptors.

By associating sentiment and polarity with certain subject identifiers, a provider can determine how users are reacting to certain subject identifiers. For instance, a provider might determine either that users exhibit a positive "satisfied" sentiment associated with a mobile software application, or instead that users exhibit a negative "frustrated" sentiment associated with the mobile software application.

The results of the subject classification analysis and sentiment analysis can yield numerous subject or sentiment identifiers. Notably, a provider might only want to display a subset of the available identifiers on the Interface GUI, such as the top 5 to 10 subjects, interaction drivers, sentiments. To select a subset of available data, the network computing device executes operations that include aggregating, across all of the content data files processed by the subject classification analysis, the number of times each distinct subject identifier occurs or is observed. The total number of shared experiences represented by the content data files is also determined. The network computing device determines number of times each distinct subject matter identifier is observed as a proportion of the overall number of shared experiences or subject identifiers, thereby determining proportion data. A similar process is used to determine proportion data for the sentiment identifiers or interaction driver identifiers. That is, the number of times each distinct interaction driver or sentiment identifier appears in a sequencing range is determined and divided by the number of shared experiences within the same sequencing range.

The sentiment analysis results, along with the subject classification analysis results, can also be used to enhance ongoing shared experiences. The content data generated from an ongoing user-provider interaction is monitored and analyzed in near real-time. FIG. 11 illustrates a process for ongoing monitoring that begins with determining a user identity and capturing ongoing content data. A provider can establish certain alert conditions based on pre-determined thresholds, such as generating an interaction alert if sentiment polarity data drops below a given polarity threshold. The alert can be transmitted to an agent computing device separate from the agent engaged in an ongoing shared experience, such as a primary agent computing device operated by a supervisor agent. The supervising agent can then communicate with the agent engaged in the shared experience or intervene to assist.

The interaction alert can include a variety of data useful for evaluating and assisting with an ongoing shared experience, including end user data, agent attribute data, subject identifiers, interaction driver identifiers, sentiment identifiers, and polarity data. To illustrate with a few simplified examples, the end user data can include one or more product identifiers representing products held by a user. In that case, the primary agent assisting in a shared experience might be able to develop a work-around for customer problem that utilizes a product held by a customer that was not originally the subject of the interaction. As another example, the end user data might include demographic or residential data that the primary agent can utilize to engage in amicable "small talk" to diffuse a tense shared experience.

The interaction alert data can also include the subject identifiers, interaction driver identifiers, sentiment identifiers, and polarity data that are utilized by the primary agent to reduce, summarize, and better understand a shared experience before attempting to render assistance. In other embodiments, the interaction alert can include agent attribute data relating to the agent engaged in the ongoing shared experience, such as data on the agent training and experience. The primary agent might use the agent attribute data to determine that an agent lacks certain training or experience that would be beneficial in applying toward a shared experience, such as training on a particular product, technical feature, or service. The primary agent can then communicate relevant information to the agent engaged in the shared experience in an attempt close any experience, training, or knowledge gaps.

Those of skill in the art will appreciate that other alert conditions are possible, and the above examples are not intended to be limiting. For instance, the provider system can generate an interaction alert when certain subject identifiers are recognized in an ongoing shared experience. This could in turn allow a provider primary agent to intervene or redirect a support request involving a particular product of concern that is reflected in the subject identifiers or involving a product for which the provider wants to increase sales. To illustrate, the provide might recognize an increase in interaction driver identifiers relating to technical assistance with the provider's website and set up a dedicated team of agents to assist with the website functions. In that case, the interaction alert might be generated when website technical assistance appears as a subject identifier, and the support request can be redirected to an agent dedicated to assisting with website functionality.

The system can also execute a routing analysis that is implemented with artificial intelligence technology to ensure that an interaction alert is directed to an optimal primary agent computing device. The routing analysis can utilize the subject identifiers, interaction driver identifiers, sentiment identifiers, polarity data, end user data, agent attribute data, or other relevant data and information. The routing analysis can generate a list of agent identifiers having a corresponding probability that an agent will be able to successfully resolve a problem or issue experienced by a user.

The routing analysis can be better understood with reference to a simplified example. The system might determine that subject identifiers for an ongoing shared experience include assistance with electronic transfers using a provider mobile application. If the polarity drops below a pre-determined polarity threshold, the system executes the routing analysis to determine one or more optimal agent identifiers who have the highest probabilities of being able to assist. The routing analysis utilizes agent attribute data to identify primary agents that have particular training or expertise with electronic transfers and/or the provider mobile software application, or primary agents that have successfully resolved similar issues during prior shared experiences. The neural network parameters relating to the agent training and experience would then carry more significance in the probability analysis for outcomes relating to particular agents having such experience.

The optimal agent identifiers are associated with primary agent computing devices used by the primary agents, and the system can poll the primary agent computing devices or otherwise analyze device activity to determine whether particular agents are available to assist. The system can then route the interaction alert to a primary agent computing device associated with an optimal agent identifier and that responded to the polling message or otherwise shows as being available to assist in an ongoing shared experience.

Interaction Graphical User Interface

The summarized, graphical representation of the content data substantially enhances access to, and understanding of, content data from shared experiences that otherwise could not be expediently reviewed or analyzed as a function of time. The result is that providers are able to proactively recognize trends in content data and develop solutions to address problems or implement improvements.

For instance, if the Interaction GUI indicates that the top interaction driver identifiers are "problems with electronic transfer," users are optimistic or satisfied with using a provider's mobile software application to transfer user account balances, the descriptor sets might yield descriptors that include "satisfied," "mobile app," or "balance transfers." In that case, the provider can proactively develop other features that utilize the mobile application in an effort to achieve positive user results for other provider products and services.

As another example, if the Interaction GUI indicates that users are increasingly or routinely dissatisfied with being "locked out" of the mobile software application, the descriptor sets for a series of time period identifiers might include descriptors for "upset," "mobile app," and "locked out." In that case, a provider can investigate the mobile software application login or authentication process to determine possible solutions for improving the mobile application. On the other hand, if the Interaction GUI indicates that users were dissatisfied with a provider's mobile software application for only a single time period, the provider might be able to determine that the dissatisfaction is attributable to an isolated event, such as a system outage. In that case, further action might not be necessary with regard to the mobile software application.

Figure 8:
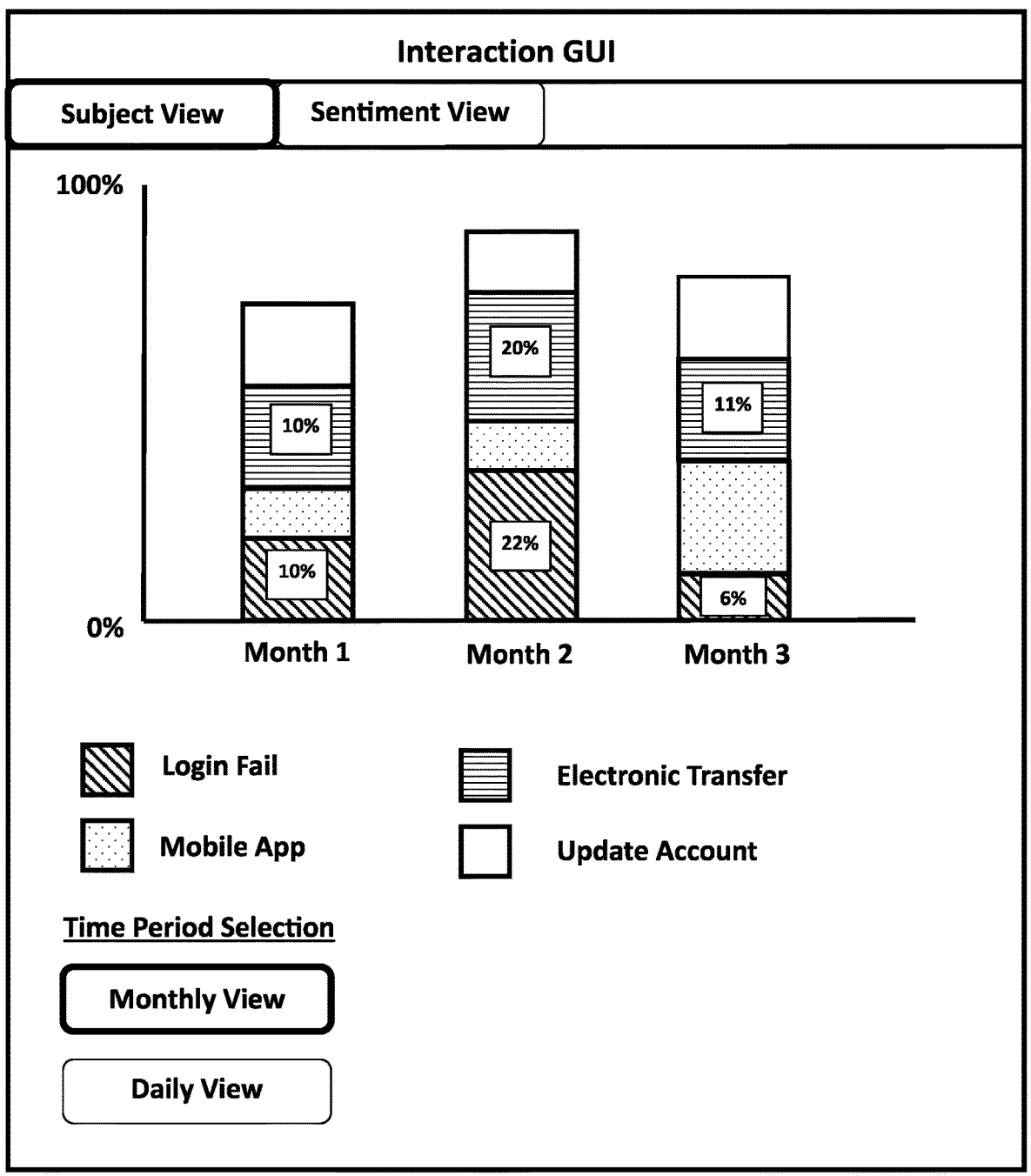
FIG. 8 is a first example of an Interaction Graphical User Interface according to one embodiment that displays aspects of analyzed content data.

As another example with reference to FIG. 8, the interaction driver identifier associated with "Login Fail" jumped from 10% of all support requests in Month 1 to 20% in Month 2. In that case, the provider might also have an IVR software system that presents users with an option to remedy a login failure. Based on the data show in the Interaction GUI reflecting a two-fold increase in Login Fail interaction drivers, the provide might investigate the provider's IVR and determine that the option to remedy a login failure is no longer operational. The provider might also, or instead, determine that the provider's website or mobile software application is experiencing a technical error with processing user login attempts. The technical error can thus be identified and resolved. If an option did not exist already, the provider might also add an IVR option to further assist users in remediating or avoiding further login failures. In that manner, the providers IVR software system can be modified to reflect the subject identifiers.

To display subject identifiers, interaction driver identifiers, sentiment identifiers, and polarity data as a function of time, the provider system can include content parameters specifying sequencing parameters that correspond to durations of time. The content parameters, including the sequencing identifiers are each associated with a time period range according to provider settings, such as a given day, week, month, year, or other suitable time period between two specified dates, as an example. The content data files include sequencing data representing a date and time that the content data was generated or that a shared experience occurred or sequencing data that otherwise indicates when a shared experience reflected in the sequencing data occurred relative to other shared experiences. In some embodiments, the sequencing data for each content data file is stored to a relational database, such as an interaction database. The interaction database allows the sequencing data to be stored as an interaction database record where the sequencing data is associated in the database records with subject identifiers, interaction driver identifiers, sentiment identifiers, and polarity data.

The content data parameters and sequencing data are retrieved by the provider system and used to perform a segmentation analysis. The segmentation analysis processes the content data files to determine whether the sequencing data for each of the content data files falls within a time period range represented by a sequencing identifier. The content data files that fall within a time period range are optionally stored to a database as a production set of content data files that are available for further processing as a set. Content data files falling within a time period range are also are associated and labeled with a sequencing identifier corresponding to a time period range. For example, the Interaction GUI of FIG. 8 includes a time period identifiers of Month 1, Month 2, and Month 3.

Figure 9:
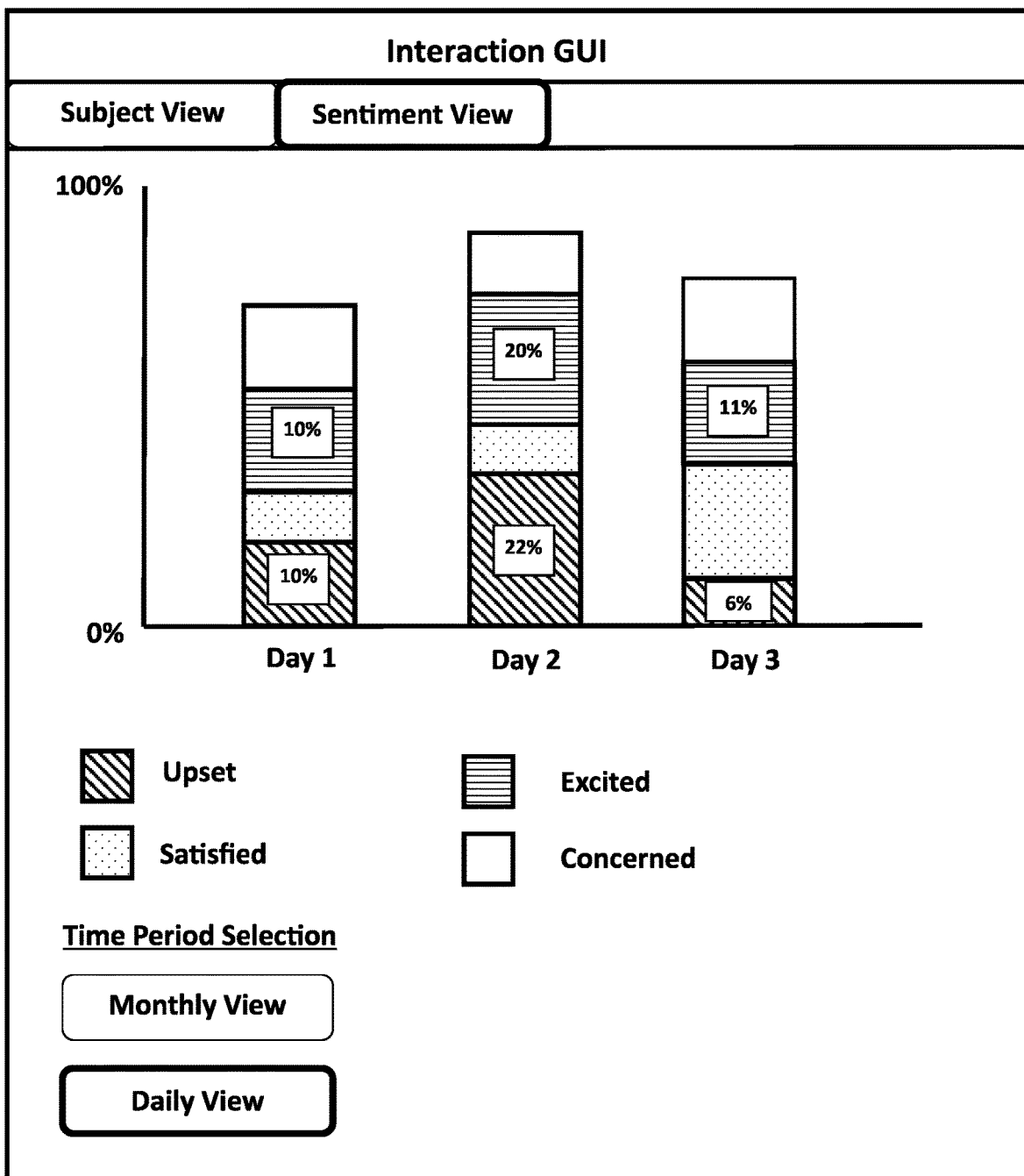
FIG. 9 is a second example of an Interaction Graphical User Interface according to one embodiment that displays aspects of analyzed content data.

The Interaction GUI, such as the example interfaces shown in FIGS. 8-10, is displayed on a monitor or display screen of an agent computing device. The Interaction GUI can be rendered by an interaction interface software service that is integrated with the agent computing device and that sends command to, and processes commands and data received from, a provider network computing device (i.e., a serer). Selecting an input option on the Interaction GUI causes the interaction interface software service to send an interface data transmit command to the provider network computing device. The interface data transmit command includes data relating to specific user selections and requests that the provider network computing device return display data that is used to generate the Interaction GUI. The display data can be transmitted from the provider network computing device to the interaction interface software service as part of an interface render command or data packet.

The display data can include the substantive data displayed on the Interaction GUI, such as subject identifiers, interaction driver identifiers, sentiment identifiers, sequencing identifiers, subject proportion data, sentiment proportion data, subject weighting data, and polarity data. The display data can also include information concerning how the data is rendered, such as instructions that are processed by the interaction interface software service to render subject or sentiment identifiers as geographic shapes, words or phrases (see FIG. 10), or graphs or charts (see FIGS. 8-9).

The Interaction GUI includes Sequence input functions that allow users to display subject identifiers, interaction drivers, sentiment identifiers, and/or polarity data according to varying time periods. The Sequence input functions can correspond to a predetermined time duration, such as a given date, day, week, or month, etc. The Sequence input functions are also formatted so as to allow users to enter a date range over which data is displayed. For example, users can enter data through the Sequence input functions to specify that data should be displayed from November 1 to November 30 on a week-by-week basis, or specify that data should be displayed from January 1 to December 31 on a monthly basis. Selecting a Sequence input function transmits an interface data transmit command from an agent computing device to the provider network computing device (i.e., server). The data transmit command includes user sequencing input data that specifies the dates and time periods selected by a user.

The Interaction GUI also includes an Attribute Layout Selection input function that allows users to switch between a Subject View and a Sentiment View. The Subject View displays subject identifier data, interaction driver data, proportion data, and subject weighting data segmented by time (i.e., sequence identifiers). Likewise, the Sentiment View displays sentiment identifier data, sentiment proportion data, and polarity data segmented by sequencing identifiers. The Attribute Layout Selection input functions are shown on FIGS. 8 and 9 as tabs near the top portion of the interface.

Selecting the Subject View input function generates an interface data transmit command that includes the subject layout selection as well as the user sequencing input data. Selecting the Sentiment View input function generates an interface data transmit command that includes a sentiment layout selection as well as the user sequencing input data.

When the interface data transmit command includes a subject layout selection, the provider network computing device can return subject identifiers (or interaction driver identifiers) along with subject proportion data and/or subject weighting data. The proportion data or subject weighting data is displayed on the Interaction GUI by displaying each subject identifier with a relative size according to the subject proportion data or weighting data, as illustrated in FIGS. 8 and 10. With respect to FIG. 8, the subject identifiers are displayed as segments, or elements, of a bar graph having a relative size according to the subject proportion data or subject weighting data. On FIG. 10, the subject identifiers are displayed as individual words or phrases of relative size according to the proportion data or weighting data. The proportion data can also be displayed as numeric values, such as the percentages shown on FIG. 8. In other embodiments, such as FIG. 10, the Interaction GUI displays the subject identifiers with a relative position according to proportion data or subject weighting data, such as displaying subject identifiers having a higher proportion or weight than other identifiers as being placed a higher position on the Interface GUI.

When the interface data transmit command includes a sentiment layout selection, the provider network computing device returns display data that includes sentiment identifiers, sentiment proportion data, and/or polarity data for display on the Interaction GUI. The sentiment proportion data is displayed on the Interaction GUI by displaying each sentiment identifier with a relative size or position according to the sentiment proportion data or polarity data, as depicted in FIGS. 9 and 10. In FIG. 10, for example, the sentiment "upset" is shown as occupying a lower position on the GUI than the sentiment identifier for "excited." This positioning indicates that "excited" has a more positive polarity or has higher proportion data such that a higher percentage of the shared experiences exhibit a sentiment of "excited" than exhibit a sentiment of "upset."

Those of skill in the art will appreciate that other methods can be used to render the subject identifiers, interaction drivers, sentiment identifiers, proportion data, and weighting data, and/or polarity data. For example, sentiment polarity can be represented with polarity symbols or color coded, such as red for negative polarity, orange for somewhat negative polarity, and green for positive polarity. In other embodiments, subject identifiers, interaction driver identifiers, or sentiment identifiers can be displayed on a pie chart with the size of the pie slices representing proportion data or weighting data. In other embodiments, the Interaction GUI can display proportion data for a subject, interaction driver, or sentiment identifier using a line graph that moves along a x-axis that corresponds to time.

Although the foregoing description provides embodiments of the invention by way of example, it is envisioned that other embodiments may perform similar functions and/or achieve similar results. Any and all such equivalent embodiments and examples are within the scope of the present invention.

What is claimed is:

1. A system for processing interactive content comprising a network computing device, wherein the network computing device comprises one or more integrated software applications that perform the operations comprising:
  (a) receiving by the network computing device, content data files that each comprise (i) a plurality of communication elements, and (ii) sequencing data;
  (b) executing a concentration analysis using the content data files, wherein the concentration analysis generates concentrated content data for each content data file by performing the operations comprising
    (i) determining a weight quantifier for the communication elements, and
    (ii) removing from the content data file, communication elements having a weight quantifier below a weight threshold;
  (c) executing a subject classification analysis using the concentrated content data, wherein the subject classification analysis processes the concentrated content data for each of the content data files to generate
    (i) one or more subject identifiers, and
    (ii) subject weighting data for each subject identifier;
  (d) executing a sentiment analysis using the concentrated content data, wherein the sentiment analysis generates a sentiment identifier for each of the content data files;
  (e) aggregating, across all of the content data files processed by the subject classification analysis, the one or more subject identifiers, and generating subject proportion data for each distinct subject identifier;
  (f) aggregating, across all of the content data files processed by the subject classification analysis, the one or more sentiment identifiers, and generating sentiment proportion data for each distinct sentiment identifier; and
  (g) receiving a layout display command comprising layout display selection data transmitted from an agent computing device; and
  (h) processing the layout display command by performing the operations comprising
    (i) when the layout display selection data comprises a subject layout selection, transmitting the subject identifiers, the subject weighting data, subject proportion data for a subject threshold number of distinct subject identifiers, and the sequencing data to the agent user computing device for display, and
    (ii) when the layout display selection data comprises a sentiment layout selection, transmitting sentiment identifiers, sentiment proportion data for a sentiment threshold number of distinct subject identifiers, and the sequencing data to the agent user computing device for display.

2. The system for processing interactive content of claim 1, wherein the network computing device performs the further operations comprising:
(a) receiving content parameter data comprising one or more sequencing identifiers that each represent a sequence range;
(b) determining whether each of the content data files falls within a sequencing range by processing the content data files and the sequencing data for each of the content data files;
(c) labeling the content data files with at least one of the sequencing identifiers when the sequencing data falls within at least one of the sequencing ranges;
(d) aggregating, across all of the labeled content data files, the one or more subject identifiers, and generating subject proportion data for each distinct subject identifier;
(e) aggregating, across all of the labeled content data files, the one or more sentiment identifiers, and generating sentiment proportion data for each distinct sentiment identifier; and
(f) processing the layout display command by performing the further operations comprising
  (i) when the layout display selection data comprises the subject layout selection, transmitting the subject proportion data for a subject threshold number of distinct subject identifiers to the agent user computing device for display, and
  (ii) when the layout display selection data comprises the sentiment layout selection, transmitting sentiment proportion data for a sentiment threshold number of distinct subject identifiers to the agent user computing device for display.

3. The system for processing interactive content of claim 1, wherein:
(a) the network computing device comprises a neural network; and
(b) the neural network is used to execute the subject classification analysis.

4. The system for processing interactive content of claim 3, wherein the neural network performs operations that implement a Kmeans clustering analysis to execute the subject classification analysis.

5. The system for processing interactive content of claim 4, wherein the neural network comprises a neural network architecture selected from one of a Hopefield network, a Boltzmann Machine, Sigmoid Belief Net, a Deep Belief Network, a Helmholtz Machine, a Kohonen Network, a Self-Organizing Map, or a Centroid Neural Network.

6. The system for processing interactive content of claim 3, wherein the neural network comprises a convolutional neural network.

7. The system for processing interactive content of claim 6, wherein the convolutional neural network (a) comprises at least three intermediate layers, and (b) performs operations that implement a Latent Dirichlet Allocation model.

8. The system for processing interactive content of claim 3, wherein the neural network comprises a recurrent neural network having a long short-term memory neural network architecture.

9. The system for processing interactive content of claim 2, wherein:
(a) the network computing device comprises a first neural network that is used to execute the subject classification analysis; and
(b) the network computing device comprises a second neural network that is used to execute the sentiment analysis.

10. The system for processing interactive content of claim 9, wherein the first neural network performs operations that implement a Kmeans clustering analysis to execute the subject classification analysis.

11. The system for processing interactive content of claim 3, wherein
(a) a labeling analysis is performed on a training set of content data files to generate annotated content data files;
(b) the network computing device processes the training set of content data files by performing a subject classification analysis that generates training subject classification identifiers;
(c) comparing the training subject classification identifiers against the annotated training set content data files to generate an error rate; and
(d) adjusting parameters of the neural network to reduce the error rate.

* * * * *